(12) United States Patent  
Marcum

(10) Patent No.: US 10,870,475 B2  
(45) Date of Patent: Dec. 22, 2020

(54) AEROSTAT ANCHORING, DEPLOYMENT, EXTENDED DURATION AND RECOVERY APPARATUS

(71) Applicant: Alfred Marcum, LaGrange, KY (US)

(72) Inventor: Alfred Marcum, LaGrange, KY (US)

(*) Notice: Subject to any disclaimer, the term of this patent is extended or adjusted under 35 U.S.C. 154(b) by 1044 days.

(21) Appl. No.: 15/326,020

(22) PCT Filed: Jun. 12, 2014

(86) PCT No.: PCT/US2014/000145  
§ 371 (c)(1),  
(2) Date: Jan. 12, 2017

(87) PCT Pub. No.: WO2014/200566  
PCT Pub. Date: Dec. 18, 2014

(65) Prior Publication Data  
US 2017/0203827 A1   Jul. 20, 2017

Related U.S. Application Data

(60) Provisional application No. 61/833,973, filed on Jun. 12, 2013.

(51) Int. Cl.
| | |
|---|---|
| *B64B 1/66* | (2006.01) |
| *B64B 1/50* | (2006.01) |
| *B64F 5/40* | (2017.01) |
| *B64B 1/58* | (2006.01) |

(52) U.S. Cl.  
CPC .............. *B64B 1/66* (2013.01); *B64B 1/50* (2013.01); *B64B 1/58* (2013.01); *B64F 5/40* (2017.01)

(58) Field of Classification Search  
CPC ...... B64B 1/60; B64B 1/66; B64B 1/50; B64F 5/40; B64F 3/00  
See application file for complete search history.

(56) References Cited

U.S. PATENT DOCUMENTS

| | | |
|---|---|---|
| 4,092,827 A | 6/1978 | Schneider |
| 4,402,479 A | 9/1983 | Phipps, III et al. |
| 4,787,575 A | 11/1988 | Stewart |
| 4,842,221 A | 6/1989 | Beach et al. |
| 5,090,637 A | 2/1992 | Haunschild |
| 6,325,330 B1 | 12/2001 | Lavan, Jr. |

(Continued)

FOREIGN PATENT DOCUMENTS

| | | |
|---|---|---|
| EP | 0 933 292 A2 | 8/1999 |
| EP | 0 933 292 A3 | 5/2001 |

(Continued)

*Primary Examiner* — Benjamin P Lee  
(74) *Attorney, Agent, or Firm* — Breneman & Georges

(57) ABSTRACT

A tethered aerostat with a ground based deployment, extended duration and recovery system to accommodate a weather vaning deployed aerostat while maintaining a supply of a lift gas by having a rotatable tether pipe and a hollow tether. Included is a rotatable tether pipe device assembly with rotor and stator components disposed in an air tight housing assembly to provide a ground based gas maintenance system. An aerostat deployment buoyancy control maintenance and combined recovery platform is provided. The tethered aerostat systems and method increase deployment duration and allow more systems to be controlled and maintained on the ground without interrupting aerostat operational capabilities.

20 Claims, 8 Drawing Sheets

(56) References Cited

U.S. PATENT DOCUMENTS

| | | | |
|---|---|---|---|
| 7,708,222 B2 | 5/2010 | Lee | |
| 8,083,174 B2 | 12/2011 | Lee | |
| 8,485,465 B2 | 7/2013 | Lee | |
| 9,399,506 B2* | 7/2016 | Cunningham | B64F 1/12 |
| 9,745,040 B1* | 8/2017 | Hall-Snyder | B64B 1/40 |
| 10,131,265 B2* | 11/2018 | Stigler | B64C 39/022 |
| 2008/0265086 A1 | 10/2008 | Lee | |
| 2010/0133385 A1 | 6/2010 | Olson | |
| 2011/0101692 A1 | 5/2011 | Bilaniuk | |
| 2012/0181380 A1 | 7/2012 | Van Staagen et al. | |
| 2013/0126675 A1* | 5/2013 | Heppe | G01M 3/38 |
| | | | 244/126 |
| 2014/0097289 A1* | 4/2014 | Heppe | B64B 1/04 |
| | | | 244/2 |
| 2015/0021427 A1* | 1/2015 | Heppe | B64B 1/64 |
| | | | 244/2 |
| 2016/0200235 A1* | 7/2016 | Stigler | B64C 39/022 |
| | | | 296/182.1 |
| 2019/0222947 A1* | 7/2019 | Shepard, Jr. | B64D 47/02 |
| 2019/0359308 A1* | 11/2019 | Azevedo | B64B 1/50 |

FOREIGN PATENT DOCUMENTS

| | | | |
|---|---|---|---|
| JP | 64 52899 | 3/1989 | |
| JP | H02 204196 A | 8/1990 | |
| RU | 2 028 249 C1 | 2/1995 | |
| WO | WO-2014200566 A2 * | 12/2014 | B64F 5/40 |

* cited by examiner

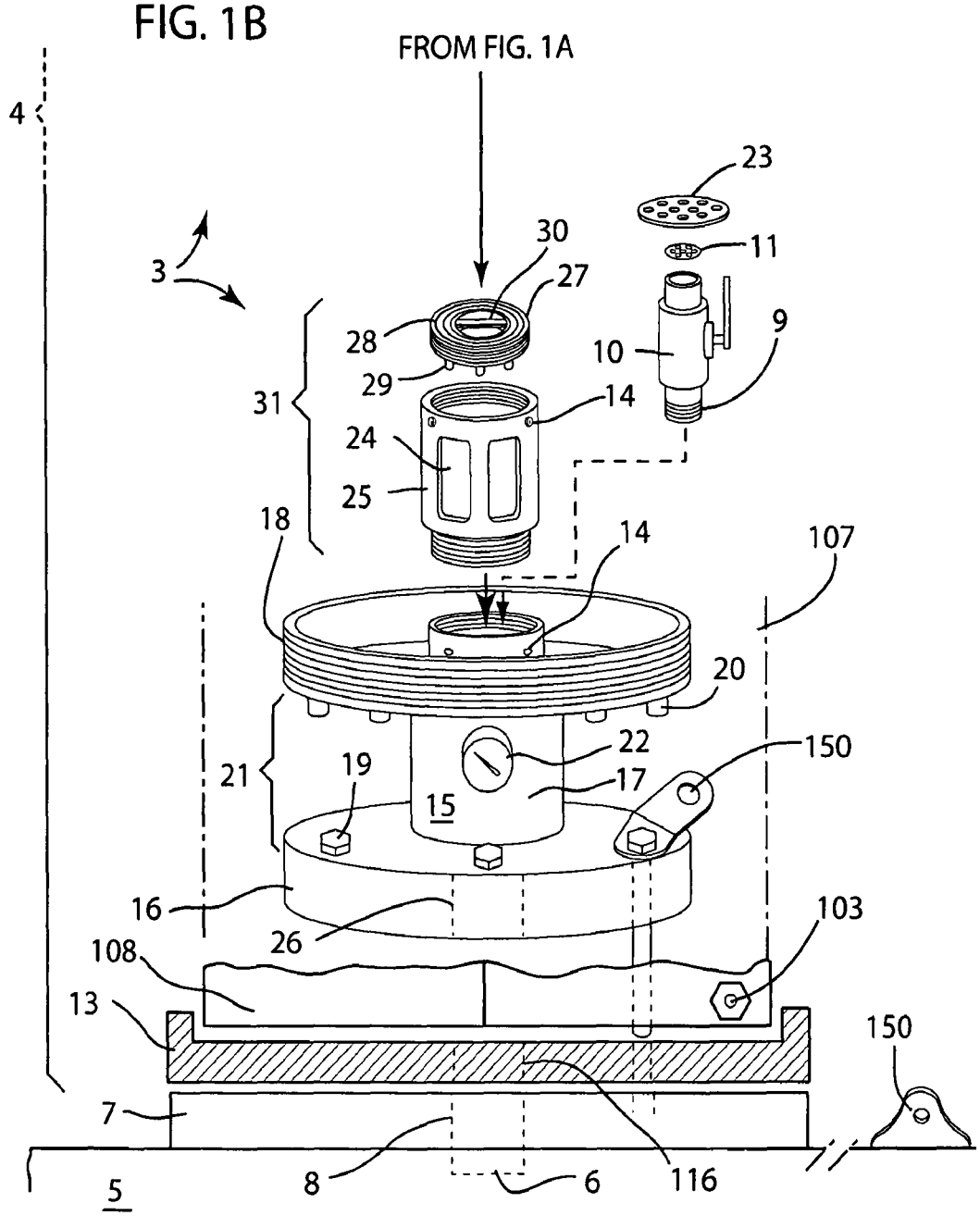
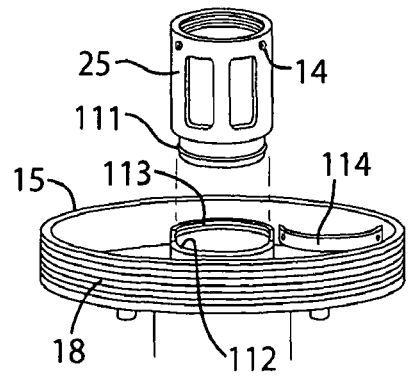

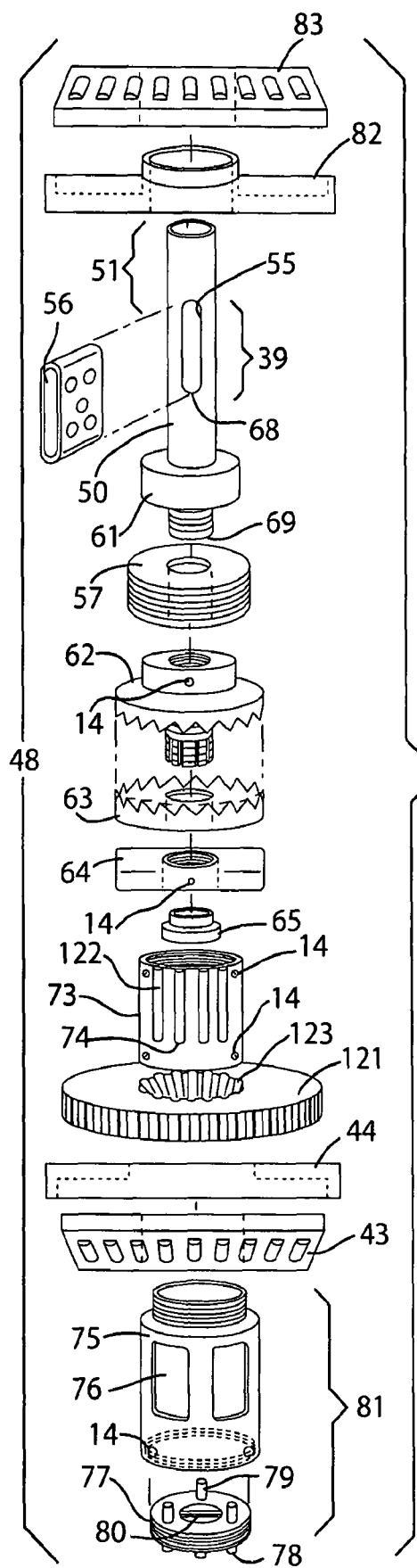
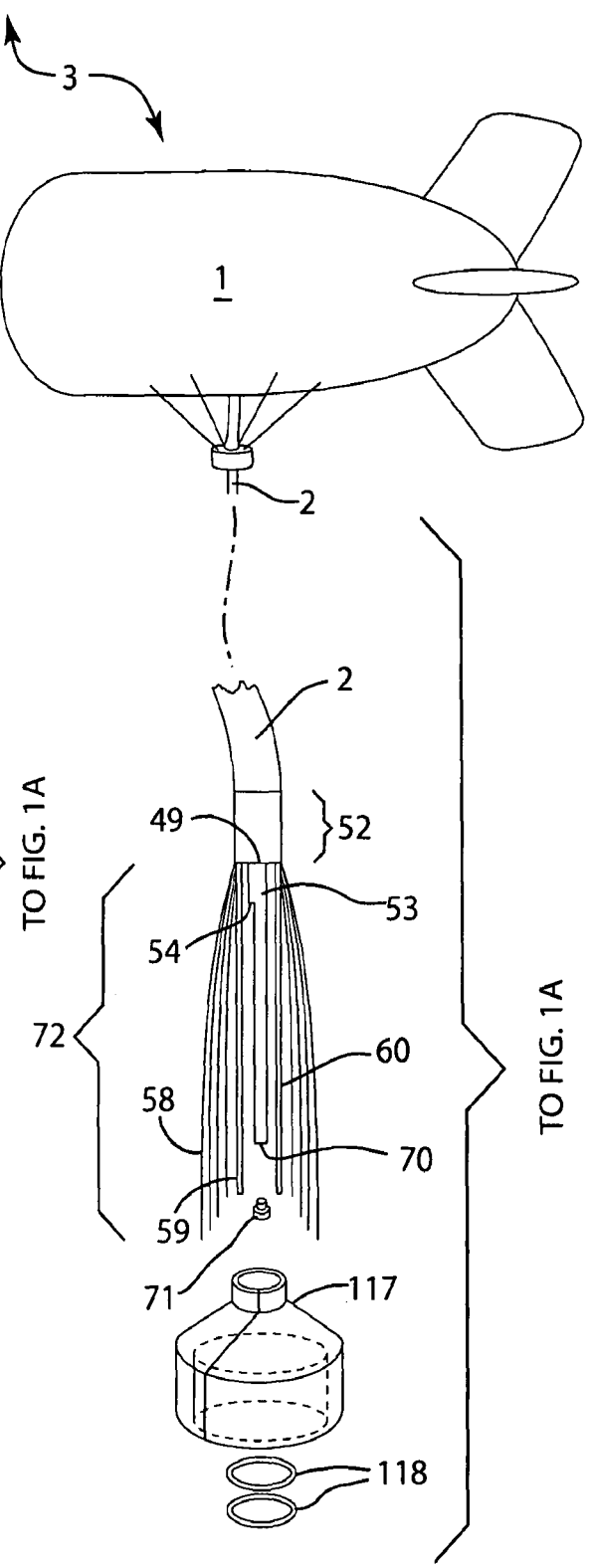
FIG. 1D
FIG. 1E

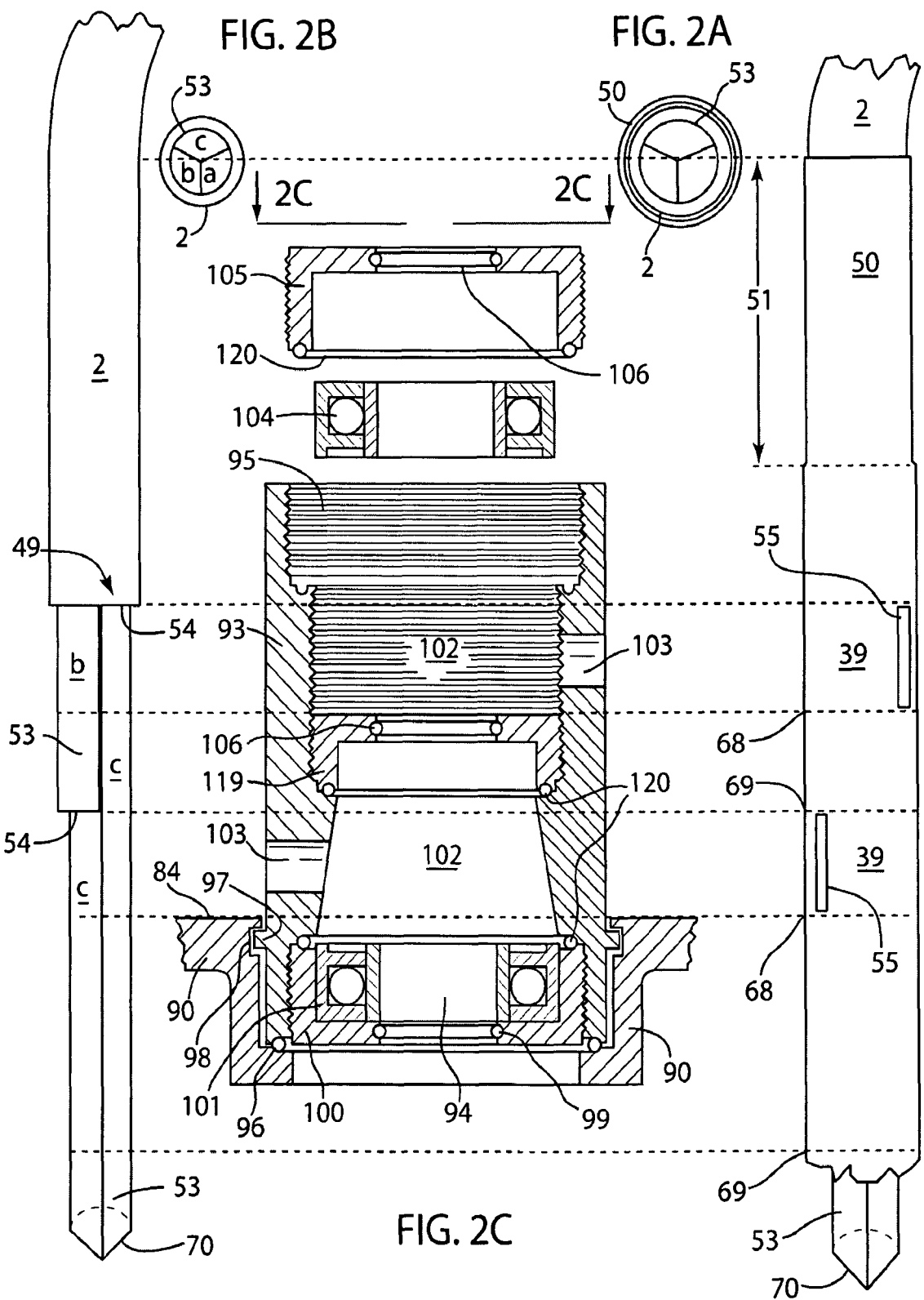

AEROSTAT ANCHORING, DEPLOYMENT, EXTENDED DURATION AND RECOVERY APPARATUS

CROSS REFERENCE TO RELATED APPLICATIONS

This application is related to and entitled to priority based on U.S. Provisional Application No. 61/833,973 filed 12 Jun. 2013 and the disclosure materials therein including drawings, photographs and disclosure which bears the title Aerostat Anchoring Vessel That Functions As A Platform For Power And Communications Cabling Interconnectivity, A Distribution Plenum For The Buoyancy Gas, And A System For Restraining The Tether Via An Integral Tether Pipe Assembly Enclosed Within The Vessel In A Rotating And Removeable Fashion.

BACKGROUND OF THE INVENTION

The subject of this invention relates to "lighter-than-air" vehicles and, in particular, aerostats that are retained and anchored to the ground or sea via a tether.

Tethered aerostats are in common use today in performance of various specialized aerial duties requiring a stable platform at altitude. The predominant problem plaguing usage of lighter-than-air vehicles lies with their inability to remain operational over extended periods of time. The capability to stay "on station" with a continuous stream of uninterrupted service are premium to most, if not all, aerostat designs and tasking assignments.

Platforms for observation, telecommunications, and weather forecasting are all suitable examples where reliability, consistency, and longevity of service are particularly vital attributes.

With further improvements in service consistency, tethered aerostats could offer solutions that other modes of communications relay could simply never match. Lower infrastructure cost, mobility, and very importantly, response time.

The common most important factor today that directly affects and limits long term aerostat operational consistency is related to the lifting gas used to make the platform lighter-than-air. Leakage and loss of a lift gas, such as for the increasingly expensive and limited supply of helium, will always remain problematic due to the small size of the gas molecules migrating through the thin skin and seams that form the flexible walls of the inflatable envelope of the aerostat. The difficulty in maintaining the integrity of the helium supply results in an insufficient gas volume for the aerostat to remain aloft long term. An equally challenging problem is the inability to maintain the lighter-than-air buoyant qualities of the helium due to the buildup of non-buoyant contaminants within the lift gas over time. These are the two primary drawbacks that hamstring tethered aerostats from attaining a longer duration of service thereby requiring their pull-down and removal from service at regular intervals for corrective maintenance. When the lifting gas suffers from either an insufficient volume and/or a deteriorating quality and degree of contamination, an inadequate buoyancy level for sustaining the aerostat at altitude will prevail that demands its retrieval.

More particularly, the anchoring system employs an intermediary structure in the form of an anchoring vessel that performs as the ground end anchoring point for the tether used to retain the aloft aerostat. This vessel houses a rotatable and removable tether pipe assembly that is securely connected and sealed to the terminal end of the tether. In accordance with its unique capability to be removed from within its anchoring structure, the tether pipe assembly and the accompanying tether are transferred alongside and with a tether storage spool for retraction of the aerostat to the ground. After service has been completed the reversal of the process can be executed where the aerostat is redeployed and the tether pipe assembly is transferred and reinserted and locked in a rotatable manner within the anchoring vessel. All functional interconnections are instantly remade allowing immediate operations connectivity and communications signaling to be relayed back and forth between the ground based operations center and the aloft aerostat and across the entire footprint outlining the area of broadcast coverage.

The anchoring vessel structure also encompasses and forms a lift gas plenum having multiple chambers within its enclosure that communicate with multiple gas routing chambers provided within the interior of the tether pipe that in turn communicate with gas passageways within or upon the tether itself. The potential pathways created by the various gas chambers and passageways collectively form a gas distribution system that provides the ability to selectively designate and choose the desired pathway(s) that facilitate and direct the continuous or intervaled single or bi-directional flow of various types of desired gasses. The gasses primarily involved may include the controlled flow of the buoyant lift gas for its replenishment and/or filtering, and the transfer of ambient air to and possibly from aerostat ballonets although direct venting to the exterior of the aerostat would probably remain as the highly practical and preferred technique for ballonet deflation. This multi-pathway of gas routing between the earth and the aerostat permits the total gaseous system to be constantly monitored, retasked, and/or serviced from the ground.

A tethered aerostat would have the capacity to remain at altitude for much longer durations thereby significantly extending the periods of uninterrupted "on station" service that could be provided by all tethered lighter-than-air vehicles and their cooperative platforms/payloads. Adoption and usage of the subject invention would allow the substantial inherent advantages garnered from the expanded deployment of tethered aerostats to be implemented to full advantage worldwide.

A search of the prior art did not disclose any patents that anticipated or precluded the claims to the invention but the following references are considered relevant. These references are Schneider U.S. Pat. No. 4,092,827; Phipps U.S. Pat. No. 4,402,479; Beach U.S. Pat. No. 4,842,221; Haunschild U.S. Pat. No. 5,090,637 and Lee U.S. Pat. Nos. 7,708,222; 8,083,174 and 8,485,465.

FIELD OF THE INVENTION

The aerostat deployment/anchoring/retrieval/mooring system of this invention employs a novel anchorage vessel that maintains a rotatable, and instantly removable, type of restraint for a novel tether termination assembly integrally connected to the end of a tether used to pay out, restrain, and pull down a lighter-than-air vehicle. Aerostat launch and recovery methods in general follow and utilize traditional approach and apparatus. An aerostat mooring cone, boom, and a powered winching system for the controlled release or retraction of the tether are substantially of conventional form with novel orientation and inclusion of some novel specialized assisting apparatus and construction for all of the preceding and, in particular, for a tether storage spool.

The invention features unique design, arrangement, and methods of restraint to be provided by the tether termination assembly. The tether termination assembly is easily removed and exchanged between either the anchoring vessel during the aerostat's long term "in service" operations, or to the tether's temporary link to a novel storage spool during the aerostat's deployment or retrieval. The tether storage spool has a novel extendable adaptation to approach, securely capture, extract, and retract the tether termination assembly, and its integrally attached tether, to a position alongside one of the endplates of the spool. Unique structure is provided for the communicative threading and placement of the tether within the endplate of the storage spool, within the boom, and within the mooring cone. An interconnected powered winching system is used to roll and store the tether's considerable footage in a traditional coiled manner upon the thimble of the spool until it is elected to either place the lighter-than-air gas filled envelope back into service through its deployment at altitude or to once again retrieve the aerostat to a ground level mooring for maintenance at specified intervals or for equipment upgrades, re-tasking, hostile weather avoidance, or emergency intervention. To execute the target goal of achieving a lengthened duration for the operational "on station/in service" phase of the aerostat system, the tether and its novel terminal end configuration are carried from their short term docking with the storage spool and are transferred to a rotatable type of secure attachment within a novel anchorage vessel that itself is generally located and advantageously affixed atop a ground based ballast tank that contains and supplies the buoyancy gas for the aerostat system.

Additionally, and very importantly, the novel tether termination assembly that has rotatable suspension within the anchoring vessel also has provisions for instantaneously making and maintaining interconnections for restraint, electrical power, communications relay, and the bi-directional flow of the lift gas(s), ambient air, or other gasses to and with the aloft aerostat via the tether.

Also, the integral tether termination assembly provides the tether with the self protective capacity to undergo and endure the bi-directional loading of axial torquing forces that are placed directly upon the tether by the aloft "wind driven" aerostat. These potentially damaging rotational forces are harmlessly dissipated by the tether termination assembly being equipped with an unrestricted degree of full rotative capability in relation to its retentive enclosure within the stationary anchoring vessel.

Even more beneficial is the capacity for the termination assembly to either be quickly removed from the anchoring vessel for aerostat retrieval or instantly and securely latched within the vessel to reestablish the rotative restraint of the newly deployed aerostat while still providing and maintaining the continuous uninterrupted bi-directional flow and connectivity for all of preceding invaluable communicative assets of operational control between the ground station and the aloft aerostat.

DESCRIPTION OF THE PRIOR ART

The popularity of the tethered variety of aerostat that is anchored at a single permanent or semi-permanent location has experienced an extensive increase in usage over the last few decades as it was recognized as a high altitude platform of significant value.

The current shortcomings of any aerostat tied to the earth by a restraining tether is the relatively short duration of "on station" performance that may be executed before the aerostat has to be retrieved to ground level primarily for reasons of reconditioning and replenishment of the lift gas before another re-launch and similar interval of operation. These cyclical periods of function are far too short to be practical for some types of aerostat service duties where longevity and consistency are a necessity, not a nicety.

Some of the most recent prior art has targeted improvements focused on extending the length of time that the aerostat can remain stationed in the air. Of highest relevance and value are U.S. Pat. Nos. 7,708,222, 8,083,174, and 8,485,465 by Lee that offer a tether consisting of embedded components that include tensile strength fibers, power conductors, coaxial fiber optic cables, and a passageway for the bi-directional transfer of lift gas within the tether. A low pressure, slow velocity pump selectively pushes or pulls a steady flow of lift gas through the passageway provided within the tether respectively to and from the aerostat in rhythm with cyclical day and night heating and cooling. Both gas replenishment and scrubbing of non-buoyant contaminants are accomplished with this system.

However, there is no description of a system designed for the isolation and independent bi-directional flow of a multiple of different gases, or how multiple passageways within or upon the tether could be isolated, routed, and interconnected through novel chambering within a novel tether pipe assembly to multiple gas chambers within a novel anchoring vessel at the ground station for the bi-directional flow of different gases or electing to alter system usage to a single directional flow of a gas or gases. More specifically, there is no description of how a combination of particular states of the same gas or how totally independent gases, for example helium and air, could flow either simultaneously or at respective different intervals of single or bi-directional flow within separate passageways between the aerostat and the ground station. There is no description or method for how the flow of air can be routed and sent to an aerostat ballonet system with no cross contamination between the types or states of any of the gasses. This flow is accomplished while the tether is securely restrained in relation to its ground anchor point while still having the capacity to fully rotate yet maintain adequate seals for the retention of the full system of involved gasses.

The present invention's capability to control the degree of ballonet inflation through a variable routing system in direct communication with the aerostat via the tether, eliminates the need for the heavy and sometimes balky operating air blowers that conventionally have to be located onboard the aerostat instead of upon the ground where they can be easily serviced or quickly swapped out upon failure.

Multiple chambers are fashioned and formed at the terminal ground end of the tether within a unique system component called a tether pipe. The tether pipe is the most basic, elementary, and instrumental component of the tether termination assembly and from this point forward the terms of "tether termination assembly" and "tether pipe assembly" are to be considered as analogous. One or more chambers may be included within the tether pipe to alter the default routing of the tether's internal passageway(s) by employing a "smart valving system" at both the ground station and the aerostat ends of the system. This would enable a multitude of gas flow choices ranging from the independent routing of one or more gasses in a single and/or bi-directional flow to the grouping together of all of the chambers within the tether pipe with all of the passageways within the tether. With the "all together" grouping the total volume of gas flow can be maximized and dedicated to one gas traveling in one direction such as might be needed for the rapid pumping of a corrective volume of gas(es) to a leaking or otherwise defective or failing aerostat preceding or during its emergency withdrawal for repairs or replacement.

Lee also describes a system of gas seals in the form of double slip rings that alternately open and close respectively with the selective use and energization of electromagnetic influence. While one slip ring prevents lift gas leakage the other slip ring allows a coiled gas feed tube to either unfurl or tighten thereby harmlessly storing the torquing forces caused by the wind driven weathervaning of the aerostat. The spiraling forces are only allowed to build to a point that safely precedes the occurrence of tether damage whereupon the respective opposite electromagnetic release and closure of these same slip rings reverses their preceding duties and thereby dissipates the stored torquing forces. However, fully revolvable, tracking the aerostat as it is randomly driven and turned by the wind, capability for allowing the tether unconstrained bi-directional revolutions in relation to the anchoring vessel, is not provided. Tracking capabilities can be programmed to initiate at any degree of aerostat turning from following every movement to a more practical incremental degree of allowable rotation of the aerostat. The anchoring system of the subject invention equips a tether to fully benefit from that bi-directional rotative capability within an essentially airtight vessel that, in addition, retains the novel tether pipe assembly in an instantly releasable but secure manner. An O-ring(s) or other elastomeric sealing system is used around the rotating tether pipe exiting the top of the vessel that continues the maintenance of a substantially airtight "internally pressurized" relationship to and for the stationary vessel.

None of the prior art reviewed describes the novel combination of a rotatable and removable tether pipe assembly and system that has integral connection and seal with and to the terminal ground based end of the tether used to restrain and anchor the aerostat. None describe a system where novel chamber(s) can be formed within that tether pipe assembly that can be selectively routed to communicate in an airtight manner directly and independently with and between designated passageway(s) on or within the core of the tether and various "on the ground" chambers that may retain the lift gas(es), compressed air, other types or states of gases, or are in connection to other gas handling, pumping, or reconditioning equipment. None describe a tether termination assembly with the capability to be quickly released from or locked within and to an anchoring point that itself is a gas storage and distribution plenum and chamber. None allow the rapid replacement of a damaged tether with a new replacement tether already prepped for instantly insertion and lockdown within the anchoring vessel at either end of the tethering system. None provide a system for either the secure attachment or detachment and transfer of the tether pipe assembly back and forth between the anchoring vessel and a tether storage spool that is respectively congruent for either maintaining rotatable restraint during the execution of "on station" duties or the retraction or deployment of the aerostat upon demand.

Even more importantly, none can execute the reinsertion and quick lock down of the tether termination assembly while instantly reestablishing the cabling, the conduits, and the infinitely rotatable, gas sealing, and operational connectivity qualities between the anchoring vessel and the aloft aerostat that the current invention delivers. None describe such a highly beneficial and versatile ground based aerostat control system that features such highly protected yet easily accessed and serviceable components. None employ such a novel storage spool and a deployment/retraction system whereby the novel releasable tether pipe assembly is extracted and securely transferred and docked alongside a base end of the spool. None have unique structure and provisions available for and upon the tether storage spool for temporarily remaking any or all of the cabling or gas connections should they be desired or necessary during retrieval or deployment of the aerostat. The base endplate of the storage spool is additionally equipped with unique "tether threadable" opening(s) that have closing/locking provisions. Similar tether threadable arrangements are also included upon the accompanying boom and mooring cone. Upon completing the execution of the controlled pay out of the tether and re-launch of the aerostat, the tether is removed from the threadable provisions whereby the tether pipe assembly can once again be transferred, reinserted, and locked within the anchorage vessel. It is in this position of secure attachment within the anchoring vessel that the aerostat system of this invention is able to provide rotatable tether restraint while completing the circuitry and routing of the piping respectively for all of the vital cabling and gas conduits of the novel system of this invention. This arrangement enables the achievement of highly lengthened periods of time where the aerostat is able to maintain its optimal positioning at the desired operational altitude thereby providing extended long duration delivery and reliable relay of an uninterrupted consistent stream of communications service and/or other "high line of sight" duties such as the continuous and seamless flow of monitoring and/or surveillance capabilities.

SUMMARY OF THE INVENTION

It is the primary focus and subject of this invention to mitigate some of the deficiencies related to tethered aerostat deployment and/or retrieval and, in particular, to control and extend the aerostat's station keeping capabilities through the design of a novel tether anchoring and ground handling system. It is also a design goal to make the system highly accessible and serviceable while the aerostat remains aloft and in full delivery of its complete package of telecommunications and other services. These design enhancements also facilitate the execution of short duration "on the ground" repairs to be executed that will limit any service interruptions to being brief in duration and often resolvable without the necessity of retrieving the aerostat to ground level.

The aerostat anchoring system includes a generally cylindrical vessel that forms a buoyancy gas plenum. The tether of the aerostat system is integrally attached to a novel tether pipe assembly forming a tether termination system capable of bi-directional rotation in relation to the stationary anchoring vessel. The tether pipe assembly is contained within the vessel in a removable fashion where it is easily detached and extracted to initiate the aerostat retrieval procedure. Upon completion of ground based servicing, the aerostat is redeployed and the tether pipe assembly is, once again, re-inserted and fastened in a rotatable and secure fashion within the anchorage vessel. The moment the tether pipe assembly is locked within the vessel all functional interconnections are instantly remade allowing the aerostat to begin immediate execution of its daily "in service" broadcast and communications relay activities.

The novel vessel structure does multi-duty service in its performance as a tether/aerostat anchoring point, a gas containment and dispersion plenum, a variable cabling and conduit interconnection and exchange chamber, and a component housing for affixing, in both a rotatable and removable manner, the terminal "ground end" of the tether pipe. The tether pipe is of novel design that promotes being bound and sealed directly to the terminal end of the aerostat tether. The tether pipe functions as a rotatable coupling for the tether to the anchorage vessel. It can quickly and easily be inserted and attached in a rotating fashion or detached and removed respectively to and from the vessel as needed for control of the aerostat during its selective placement in and out of service. This capability to easily execute instantaneous removal of the tether pipe from the anchoring vessel is particularly advantageous so that the tether pipe and its integrally attached tether may be quickly and securely latched to a novel extraction and docking apparatus that securely transfers the tether pipe and related components alongside a novel tether storage spool that is equipped with a winching system used for the controlled deployment or retrieval of the aerostat. Additional provisions are made available upon the storage spool that enable maintaining continuity for any or all of the desired interconnections for power, communications, and gas transfer between the ground control station and the aerostat during both placement procedures should it be desired.

More particularly, it is the additional focus and subject of this invention to employ novel design measures for the terminal end of a tether that thereby offer novel selective control and routing for the single or bi-directional flow of a gas(s) to and from the aerostat. This capability to establish a bi-directional flow of gas is accomplished by the selective communication between single and/or multiple passageways provided within or upon the tether and novel independent airtight chambers that are selectively formed within the novel tether pipe assembly. The tether pipe assembly itself is suspended within a novel anchoring vessel that enables the airtight chambers within the tether pipe to communicate with novel chambering that is formed and isolated within that anchoring vessel that all further communicate with inlet and outtake ports upon the vessel that may be interconnected as desired to various piping configurations to and from the ground station. All of these gaseous chambers and routing within the anchoring vessel, the tether pipe, the tether, and the aerostat additionally and collectively communicate with a ballast tank(s) and related structure(s) of the ground control system that deliver the lift gas or other gasses and/or provide storage, filtering, mixing, or other gas(s) manipulations and/or states.

It is a primary intention for this novel system of aerostat gas routing and control to selectively employ intermittent and/or continuous gas flow to "replenish" the lift gas volume, to "recondition" the lift gas quality, to "control air flow" with a ballonet system within the aerostat, and/or function or supply other "as needed" gas flow duties. These gas control functions are vital to extending the length of aerostat duty and are all executable while the aerostat remains deployed at altitude and continues its "in service" state of operation. Gas loss and contamination within any aerostat system are inevitable concerns that can be limited but not totally prevented. However, gas reconditioning can be executed through the novel routing and handling of the offending gas mixture whereby the removal (scrubbing) of the infiltrated non-buoyant air, water vapor, and other undesirable gaseous elements are accomplished on the ground while the aerostat remains deployed aloft. In concert with that gas reconditioning, ground based gas flow can also be executed for both lift gas replenishment and measures of improved aerostat control by the singular or bi-directional respective flow of the lift gas(s) and/or compressed air or air mixture flow to a ballonet system. These measures for providing selective gas flow and/or reconditioning between the ground and the aerostat would be improvements of high value in significantly extending the duration of the intervals of time that the aerostat can remain both aloft and entirely operational in providing a continuous flow of consistent uninterrupted broadcast service.

An additional novel and significant solution is provided for the problem of mounting an airtight anchoring vessel system directly atop the lift gas ballast tank and yet be able to utilize a tether storage spool and winching system for either the controlled release or draw down retrieval of the aerostat from its intended operational height in the air. This is accomplished through a novel positioning, capture, transfer, and retention structure provided upon the novel storage spool in tandem with the capability to elect the instantaneous removal of the novel tether pipe assembly from the novel anchorage vessel.

Accomplishing the preceding while rectifying problems primary to extending a lighter-than-air vehicle's capability to provide long term deployment and service at its designated altitude along with eliminating the need to carry heavy onboard aerostat blowers through the additional control measure for the selective novel routing of the direct flow of air to ballonets contained within the interior of the aerostat envelope, are all highly beneficial and significant advancements. Their accomplishment while providing an aerostat control system that has ground based components that are all highly protected, accessible, and serviceable while the aerostat remains deployed, and while maintaining a consistent and substantially airtight seal for the entire aerostat gaseous delivery system, and while ensuring constant continuity for the electrical supply and communications cabling contained within or upon the tether while that tether remains both rotatable and instantly removable respectively to and from its anchoring system, would total in their collective sum as major improvements in aerostat design, control, longevity, and sustainability of operations.

BRIEF DESCRIPTION OF DRAWINGS AND BEST MODE

FIGS. 1A to E is an exploded plan view of the preferred embodiment with FIG. 1F being an alternative connection for the stator to the bottom end of the anchoring vessel housing;

FIG. 2 is a drawing depicting alternate auxiliary air chamber arrangements within a detachable chimney along with demonstrating tether pipe, tether, and gas supply tube interrelationships with both the chimney and the top enclosure of the anchoring vessel;

FIG. 2A represents end and plan views of the tether pipe;

FIG. 2B represents end and plan views of the gas supply tube;

FIG. 2C shows cut away plan view of the chimney;

DETAILED DESCRIPTION OF THE SPECIFIC EMBODIMENTS

Figure 1A:
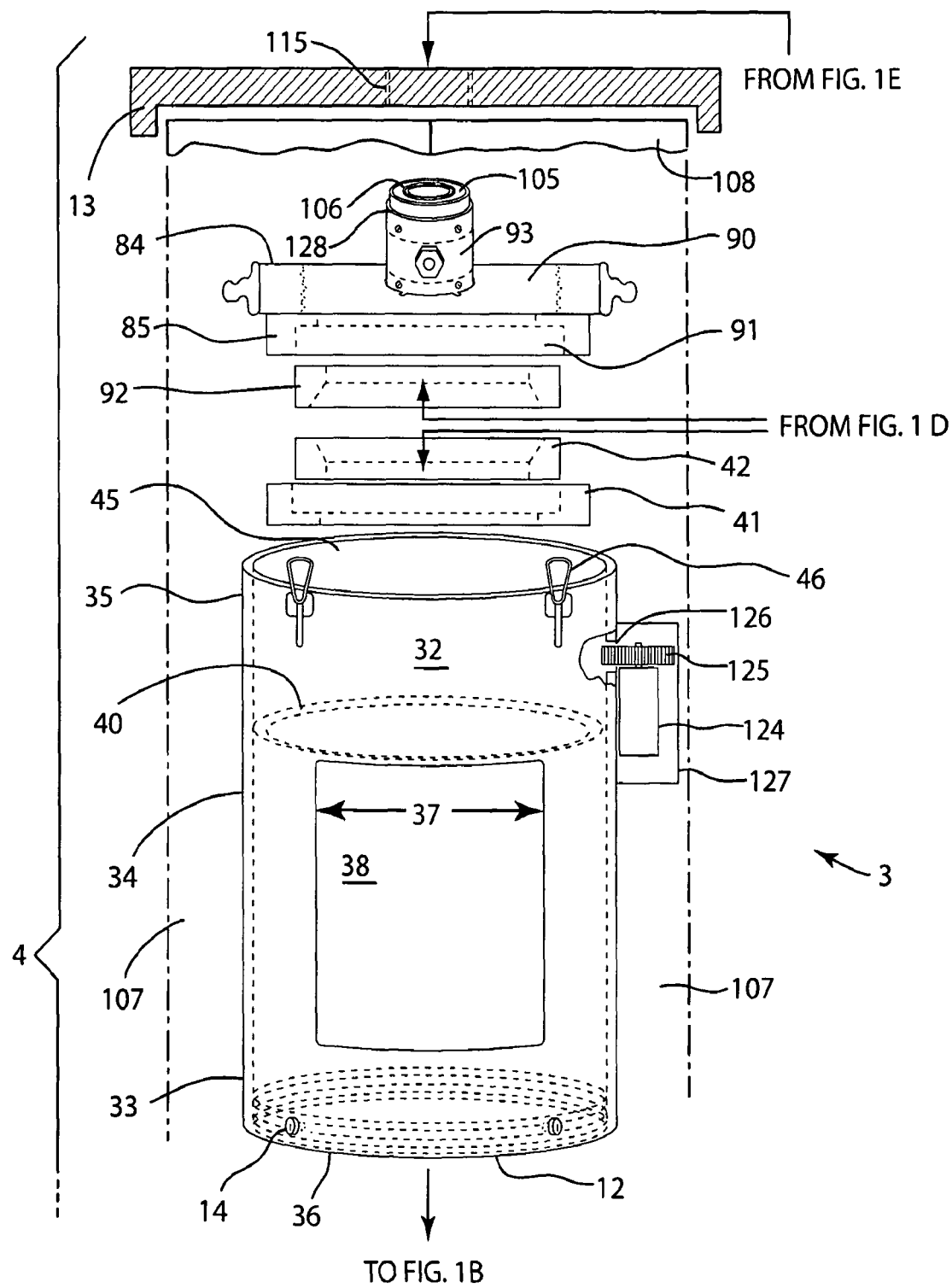
Figure 1C:
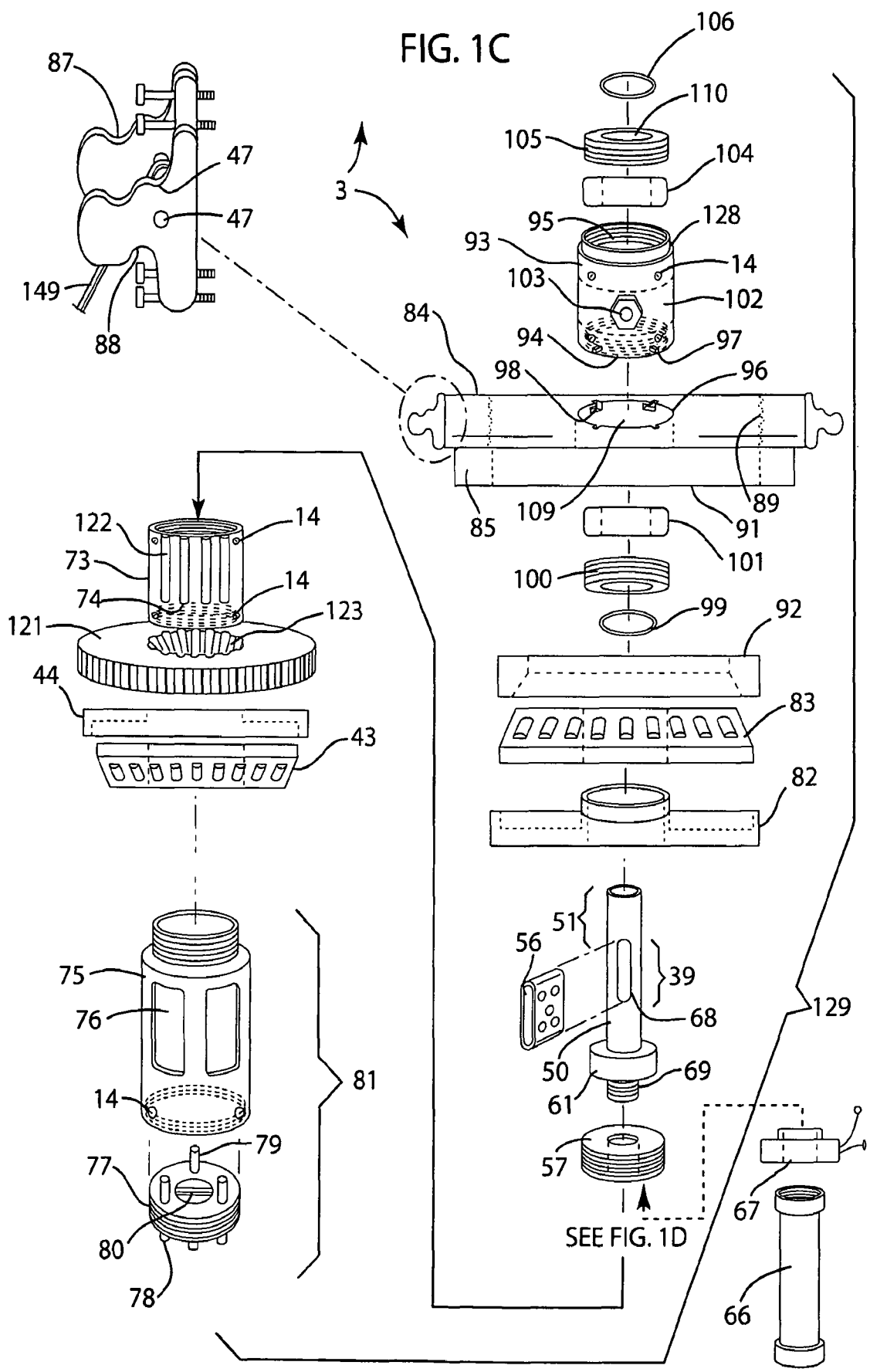

Viewing FIG. 1A to E (collectively FIG. 1), the present invention includes an Anchoring System 3 that restrains an Aerostat 1 while relaying communications, functional interconnections, and control measures between a ground control station and Aerostat 1 via a Tether 2. The aerostat/tether Anchoring System 3 includes a generally cylindrical Anchoring Vessel 4 that forms a buoyancy gas plenum and a dispersion and distribution chamber in the form of a Gas Chamber 12. In addition, Anchoring Vessel 4 provides housing and anchorage within for Tether 2 whose terminal ground end is integrally attached and sealed within a Tether Pipe 50. The tether pipe is the core component of a Rotatable Tether Pipe Assembly 48 that is instantly releasable and removable from Anchoring Vessel 4. The moment the tether pipe assembly is reinserted and latched within the vessel, full rotative and anchorage qualities are restored and all functional interconnections between the ground based operational station and Aerostat 1 are immediately remade allowing the aerostat to begin straight away execution of its daily "in service" activities.

Still viewing FIG. 1, Anchoring Vessel 4 primarily consists of three major components, a lower level base (I-Hub 15), a middle level vessel (Barrel 32), and an upper level enclosure (Top Hat Assembly 84) that serves as a novel finial top of the vessel of vital import and function.

I-Hub 15 is the base portion of the vessel that is cooperatively fashioned in the general form of an "I" shaped cylindrical hub. A Lower Portion 16 of the I-Hub is interconnected and affixed to an Upper Portion 18 by a Middle Portion 17 in the form of a generally cylindrical central column. The lower portion of the I-Hub forms a circular mounting base with mounting holes therethrough for the insertion and tightening of Anchor Bolts 19 thereupon. The Upper Portion 18 of the I-Hub forms a circular shelf with a number of threaded through holes. The underside of this circular shelf acts as an exterior platform for mounting a plurality of Intake/Outtake Ports 20 for piping, cabling, valves, gauges, sensors, switches, or other monitoring devices and controls that are all highly accessible and serviceable while the system is in use and the aerostat deployed. Generally, all attachments and connections to these ports are in parallel to the long axis of the I-Hub base and extend within a Shielded Space 21 formed around the central column of the middle portion between the upper and lower portions of the I-Hub. This space importantly offers physical protection from damage. All of the interconnection points for these somewhat fragile but vitally important instruments and controls are thereby shielded from impact due to their mutual location and containment inside the circumference of both the top and bottom portions of I-Hub 15 where they physically remain within the boundaries outlined by the footprint of the entire vessel.

The Lower Portion 16 of the I-Hub 15 base is generally bolted within threaded holes of a Base Plate 7 affixed upon the top of a lift gas Ballast Tank 5. The I-Hub base includes a circular O-Ring or gasket of a type common to the art that is generally situated inside the circumferential physical location of the I-Hub mounting holes. This arrangement permits the gasket to form an airtight seal between the I-Hub and the base plate while the mounting holes and bolts themselves need not be airtight in relation to the ballast tank. The ballast tank can be located on the ground at an operations station or it may be situated upon a mobile Transfer and Deployment Trailer 160 shown in FIGS. 4 and 5, or other transport medium for rapid deployment to the destination of choice.

Still viewing FIG. 1, Ballast Tank 5 has a generally threaded Ballast Tank Orifice 6 that aligns, communicates, and may be affixed in an airtight manner with a generally unthreaded Base Plate Orifice 8 that passes through Base Plate 7. A Buoyancy Gas Standpipe 9 of select diameter and length has one of its ends possessing a generally male thread pattern whereby the standpipe can be mated and threaded in an airtight manner within the generally female threads of Ballast Tank Orifice 6. The standpipe is used as a generally free standing gas conduit that extends upwards a select distance within the base of I-Hub 15 as it passes through a Vessel Base Orifice 26 thereby providing a defined internal, highly shielded, passageway for travel and transfer of the buoyancy gas from the ballast tank to the interior of Anchoring Vessel 4. Upon pressurization of the vessel interior a Gas Pressure Gauge 22 is generally provided upon and through the wall of the central column of the Middle Portion 17 of I-Hub 15 that is used to monitor the desired pressure range controlled and set by a pressure regulator of a general construction common to the art. In addition, the standpipe would normally include a Shutoff Valve 10 somewhere along its length. Generally, the spindle of the valve would also pass through, in an airtight manner, the cylindrical wall of the Middle Portion 17 of the I-Hub. An exterior valve handle is connected to the valve spindle within Shielded Space 21 formed between the upper and lower portions of the I-Hub that blocks accidental contact while still providing ready access to intentional hand manipulation of the manually operated valve. An additional option is an electronic actuated valve of a general construction common to the art that is enclosed within the I-Hub that is generally controlled by either wired or wireless design circuitry. The top of Standpipe 9 is fitted with a gas permeable Debris Screen 11 to block contaminant particles or small dropped components from vertical entry into Ballast Tank 5 via an otherwise open standpipe.

Most importantly, the overlying I-Hub 15 has a generally female threaded top opening that is first fitted with a Debris Shield 23 that has a generally slip in fit and secondly is mated with the generally male threads on the bottom end of a novel Stator Platform 25. Secure locking between their two inter-threaded alignments can be additionally augmented with a set of Clamping Set Screws 14 around the exterior of the female threaded top opening of the I-Hub. The stator platform features unique Stator Platform Open Sides 24 that forms circumferential sidewall openings that allow passage of a technician's hand within the generally open inner structure of the stator platform. On its opposite top end, the stator platform generally has a female threaded open top where a male threaded Stator Plate 27 can be inserted, tightened, and adjusted to the height and level desired within and to Stator Platform 25 and to its relative location within the interior of Anchoring Vessel 4. Once the correct height for the stator plate is achieved, stator Clamping Set Screws 14 located on the side of the Stator Platform 25 can be tightened to affix the stator plate position within the platform. Stator Plate 27 has a set of Concentric Conducting Tracks 28, generally known by the art as "pancake slip rings," situated upon and generally flush with its top surface. Track Standoffs 29 connector posts extend within the accessible interior of the stator platform framed by Stator Platform Open Sides 24 that enable execution of the desired conductor hookups, connections, and adjustments by the technician. The center of the stator plate has a central opening that nearly spans the inner dimension of the smallest of the concentric tracks. The opening is bisected with a Stator Bracket 30 that is generally oriented parallel to the track bearing surface and is either an integral portion of the stator plate or is mounted and affixed as a separate and removable component. The stator bracket acts as a platform for mounting the connectors for the coaxial fiber optics or other transmission connectors and cabling. The number of mounting locations could be increased by elimination of the central opening and placing a plurality of through holes upon the central surface of the stator plate. The combination of the preceding stator parts and component arrangements collectively form a Stator Platform Assembly 31.

The concentric conducting tracks of the stator plate are designed to make intimate contact with Spring Loaded Electrical Brushes 78 situated in an opposing concentric placement upon and therethrough an opposing Rotor Plate 77 mounted in reverse image with Stator Plate 27. The rotor plate is of similar design to the Stator Plate 27, with a central Rotor Bracket 80 for mounting communications cabling and is affixed upon a Rotor Platform 75 by Clamping Screws 14. The opposing ends of the spring loaded brushes are provided with integral threaded Brush Standoffs 79 of similar design to Track Standoffs 29. The brush standoffs will provide interconnection with the imbedded conductor leads that extend from the Tether 2 that has integral connection and seal to Tether Pipe 50. The tether/tether pipe union and all of their embedded components have vertical entry within Anchoring Vessel 4 from a Top Open End 45 of Barrel 32. The Brush Standoffs 79 extend within the Rotor Platform Open Sides 76 of the interior of the Rotor Platform 75 for technician connection and adjustment. Their collective parts and component arrangements form a Rotor Platform Assembly 81 that is to be attached to the terminal end of the Tether Pipe 50 that maintains a rotatable type of immersion and attachment within and to Anchoring Vessel 4.

The tether pipe and its attached rotor platform and are to be suspended from the top of the vessel down within its interior where the stator/rotor plates are aligned in an end to end mirrored relationship where each may be adjusted to achieve the desired interspacing between their mutual surfaces and clamped by the set screws of their respective platforms. It is requested to be understood that the stator plate with its concentric tracks and the rotor plate with its spring loaded brushes could be reversed whereby they swap mounting locations upon opposite platforms and would still function equally well with no ill consequence. Each concentric size of track on the stator plate has its own standoff conductor that maintains circuit continuity exclusively with its respective track. Each brush on the rotor plate has its own standoff conductor that maintains circuit continuity exclusively with its respective brush. Both types of standoffs extend within the open service access areas of their respective platforms thereby granting direct hand wired availability to make, adjust, or repair connections of the electrical conductors to the standoffs. The standoffs of the concentric conductor tracks of the stator plate generally connect to power supply conductors running from the operations base station where they enter the interior of the vessel through I/O Ports 20 situated upon and therethrough the Upper Portion 18 of the I-Hub 15. The standoffs of the rotor plate connect to Power Supply Conductors 59 leading from the tether pipe that are imbedded within the tether that anchors the aloft aerostat. When the stator platform and stator plate are aligned end to end relationship to the rotor platform and rotor plate, the concentric tracks of the stator plate and the matching concentric placement of the brushes upon the rotor plate make intimate contact where they thereby complete the circuit in carrying a continuous flow of power from the base station, through the tether, and to the aloft aerostat even while the tether, tether pipe, and rotor are rotated in relation to the fixed stator within the stationary Anchoring Vessel 4. This full bi-directional rotative capability is used to track and follow the random, weathervaning, wind driven oscillations of the aloft aerostat thereby dissipating and preventing damage before torquing forces can accumulate and be detrimentally applied to the embedded components within the tensioned tether.

Similar hand accessibility is available for connecting Tether Communications Cables 60 in the general form of coaxial fiber optics transmission cabling to the cross brackets of their respective stator/rotor plates and platforms thereby relaying their bi-directional signals back and forth between the operations base and the aerostat. The center located "on axis" mounting connection upon the opposing brackets can be either a hard wired "rotating" type of interconnection or it may be wireless. The remainder of the mounts on the respective brackets that are intended for telecommunications transmission must employ wireless signals for their links since they are "off axis" to tether rotation. It is also requested to be understood that a system that employs concentric brushes and conductive slip rings are "old school" arrangements that tend to introduce electrical noise to their interconnected systems. Their inclusion is primarily meant to be demonstrative in validating and offering feasibility of design for the anchoring system as a whole. The unique open design of the platforms themselves, the methods and capabilities for the physical mounting of the stator/rotor assemblies, and the methods of mutual spacing, alignment, and fine adjustment for those same stator/rotor assemblies that afford superior hand access within the interior of their containment vessel are all demonstrated in such a manner to be effective yet remain highly serviceable even while the interconnected aerostat remains aloft. In all likelihood, the brushes would be replaced with more modern wired/wireless arrangements for the slip rings, electrical conductors, and optic fiber cables that would still work hand in glove and benefit from the ample spacing and organized layout of the overall physical design and component arrangements within Anchoring Vessel 4 of the present invention.

The stator platform is attached to the Upper Portion 18 of the I-Hub through which the lift gas must pass as it is received from the open end of Buoyancy Gas Standpipe 9 or Shutoff Valve 10 and has integral communicative connection to the ballast tank retaining the supply of lift gas. The gas flow from the standpipe continues upward respectively through both the standpipe Debris Screen 11 and the Debris Shield 23 that protects the top of the I-Hub where it enters the bottom of the interconnected Stator Platform 25. The generally open configuration of the stator platform framed by the stator service open access areas that allow insertion of a technician's hands also additionally permits superior circulation of the lift gas within and through the stator platform body to the interior of the vessel. Additionally, the lifting gas also flows within and through the similar rotor service access areas framing the open interior of the rotor platform. This arrangement still provides adequate gas flow in the event it is elected to eliminate both the central openings and the related brackets that bridge the openings of either or both of the stator and rotor plates. These alterations would allow an increase in the number of mounting holes to be placed upon their mutual faces that would in turn change the pattern, numbers, and the possibilities for their interconnection point(s). The matching large open service areas upon the sides of each platform would continue an overabundance of capacity for the upwards flow of lift gas from the ballast tank to freely reach the terminal end of the Tether Pipe 50 and its integrally connected Tether 2, and more specifically, reach a Terminal End 70 of a lift Gas Supply Tube 53 that is embedded within the tether.

The tether pipe is integrally connected and sealed to the tether that generally has an axial, central gas passageway in the form of lift Gas Supply Tube 53 that is imbedded within its interior for the transmission of lift gas along its entire longitudinal length. This arrangement allows the controlled delivery of the lift gas from the ballast tank, through the anchoring vessel components, through the tether, and to the aloft aerostat. This gas passageway can be singular where gas transmission flows one way for a period of time and then is reversed for gas flow in the opposite direction as desired. The gas passageway imbedded within the tether also might be longitudinally segmented into multiple passageways thereby creating options for gaseous transmissions back and forth between the ballast tank and the aerostat. With more than one passageway provided, one arrangement optionally has a gas transmission with singular "one way" flow per the first passageway and the same gas have return flow in the opposite direction within a second passageway or, for example, it could be desired to have selective bi-directional flow of a lift gas in one passageway and bi-directional flow of air or another type of gas in the other passageway(s), or singular flow in two passageways and bi-directional in another. How these passageways are contained and routed within the singular body of the rotatable tether pipe and then segregated within the anchoring vessel to specific gas chambers or conduits is a novel improvement which will be fully detailed forthcoming in FIGS. 2, 2A and 2B.

The Barrel 32 forms the main body of Anchoring Vessel 4 and outlines a generally cylindrical enclosure that has both top and bottom open ends. The bottom Base Open End 36 is oriented toward the ground while the Top Open End 45 of the barrel faces skyward.

In general, the interior of the barrel substantially forms an airtight retentive chamber that houses components suspended within that allow the tether to rotate in relation to the stationary anchoring vessel while still providing consistent uninterrupted communication between the tether's electrical conductors, transmission cabling, and gas passageways and other auxiliary components such as a direct electrical dissipation path between the aloft aerostat and the ground.

The Base Open End 36 of Barrel 32 has a generally threaded type of interconnection to the just described I-Hub 15. The female threaded Base Open End 36 of the barrel is rotated over the male threaded top end of the I-Hub whereby their mutual intra-threading is affixed by Clamping Set Screws 14 located around the base of Barrel 32. The Top Open End 45 of Barrel 32 is generally equipped with a telescoping "slip in" and clamped type of interconnection to a Bushing 85 that is a component of the Top Hat Assembly 84 at the very top of Anchoring Vessel 4. Thereagain, the interconnections at both ends of the barrel may be made mostly airtight by employing suitable airtight sealant methods known to the art such as the use of elastomeric O-rings. Detailed examples of mating components that result in generally airtight connections will be described forthcoming in FIG. 2 that would suitably represent similar type of connections needed at both ends of Barrel 32.

More specifically, the interior of the barrel enclosure is primarily divided into three zones that house the suspension of the specific functional component groups integral to function, anchorage, and the rotational characteristics of the anchoring vessel system. This is accomplished through novel platform and positioning systems within the barrel that precisely orient the rotating "tether based" components to and with their sister stationary "barrel based" components while all are contained within the confines of the "to be sealed and generally airtight" Anchoring Vessel 4.

Upon full assembly, these specific component groups have a particular positional disposition within their zone of the barrel whereby their functional interfaces are executed within that particular zone.

A Bottom Interior Third 33 of Barrel 32 houses the novel suspension within of the Stator Platform 25, Stator Plate 27, Concentric Conductor Tracks 28, Track Standoffs 29, and Stator Bracket 30 that function collectively as Stator Platform Assembly 31 where all may be mounted in a fixed relationship and position to and with the novel I-Hub 15 base portion of the anchorage system. The Base Open End 36 of Barrel 32 is interconnected with the I-Hub 15 via its mutual intra-threaded connection and thereby overlies, encloses, and becomes one with these generally motionless stator platform components.

A Middle Interior Third 34 of Barrel 32 houses the novel suspension within of the Rotor Platform 75, Rotor Plate 77, Brushes 78, Standoffs 79, and Rotor Bracket 80 that function collectively as Rotor Platform Assembly 81 through their novel interconnection through the Top Open End 45 of Barrel 32 with the novel Rotatable Tether Pipe Assembly 48 of Anchoring System 3.

A Top Interior Third 35 of the Barrel 32 houses a Lower Tapered Roller Bearing 43 and an Upper Tapered Roller Bearing 83 and their respective novel positioning platforms. The positioning platforms carry the respective races for this pair of tapered roller bearings whereby the platforms determine the upper and lower extremes for the physical location of the bearings within the vessel interior. This generally matched set of tapered roller bearings possess the capability to carry the entire retentive load of the anchorage vessel system, both on and off axis, while still promoting the novel free rotation, suspension, and precise positioning of the tether pipe assembly within the fixed barrel interior. However, the barrel located roller bearings are additionally augmented with a bearing set located within the top hat assembly that provide specific radial support for the tether pipe as it exits the anchorage vessel from within and out of the Top Hat Assembly 84 that will be detailed forthcoming.

One of the targeted goals for vessel design and operation is for the system to be constructed and composed of component groups rather than individual parts. Since the very nature of a telecommunications platform and system is its operational consistency and reliability over the long term, the targeted goals for system design are to provide a very high degree of access to the component parts within the anchorage system for their inspection, adjustment, and/or replacement with minimal interruption while the aerostat remains deployed and in service.

With that objective in mind, a Service Hatch 37 may be provided therethrough a substantial portion of the cylindrical sidewall of Barrel 32 of Anchoring Vessel 4. The service hatch requires sufficient dimensions to allow a technician to maintain quality sightlines while inserting a hand(s) to make adjustments, connections, or replacements of components within the interior of the barrel. In general it is recommended that the service hatch involve and occupy approximately a quarter of the barrel circumference and approximately two thirds of the barrel height. In particular, the hatch is located and centered over the lower and middle thirds or zones within the barrel that overlie the locations of the stator and rotor platforms. With this hatch location the entire suspended profiles that the stator/rotor platforms occupy respectively within those zones are fully exposed. The hatch is fitted with a Service Hatch Door 38 that is sufficient to fill the void of the Service Hatch 37 opening as well as providing a positive seal with and to the hatch thereby returning the anchorage vessel to airtight status. Since the lift gas inside the vessel will be pressurized to some degree, the peripheries of the door and the hatch have an interlocking taper. They have a cooperative large to small taper respectively from the interior to exterior of the vessel. This design allows the higher interior pressure of the vessel to be of aid in maintaining their mutual seal by pressing the circumferential taper of the door outward against the interlocking circumferential taper of the hatch opening of the stationary barrel. Maintaining a quality seal is further aided through inclusion of door levers and conventional O-rings or other gasketing known to the art. It is recommended, however not imperative, that the hatch door be manufactured out of a transparent material for clear interior viewing and observation of the movement of the respective components of the rotatable rotor in relation to the stationary stator while the vessel is sealed and in a state of pressurized service. When it is elected to open the hatch, the interior pressure is bled through valving and piping combinations that generally may communicate s between the vessel interior on one end and a lift gas scrubber method and mechanism known to the art or other isolatable gas storage mediums at the opposing end. The vessel end of the piping would generally interconnect and access the vessel interior through one of I/O Ports 20 located upon and therethrough the shelf formed by Upper Portion 18 of I-Hub 15. The door levers are turned and/or loosened and the convex door is pushed inward where it is disengaged and temporarily stored laterally where it conveniently nests along the concavity of the barrel interior.

At this point full side access through the open hatch is available to the entirety of both the stator and rotor platform assemblies for the quick adjustment of any and all of their respective components. Novel full replacement of either or both the stator plate/rotor plate assemblies that carry all of the vital conductor points of connection, can also be executed from the access hatch. The first step is to disconnect their wiring and loosen their respective set of clamping screws. The next step involves executing hand initiated rotation of the plates within the threaded tops of their respective platforms in a direction consistent with continuing their original "tightening" action. This will effectively rotate the plates further inward and into the open areas of their respective platforms framed by the open service access areas. The threading arrangements at the tops of both of these platforms terminate at points conducive to allowing the stator/rotor plates to be tightened past their threading termination where their full disengagement will promote their free passage within the interior of each platform. The service access area openings of both platforms are of sufficient dimension to allow the lateral diagonal extraction of each plate out of their respective platform where they can be totally removed from the anchoring vessel structure for service or replacement.

The replacement process for either or both plates is the reversal of the extraction process whereby the plates are inserted within the interior of the service access areas and threaded within the tops of their respective platforms. The threading is accomplished by employing a "loosening" rotation whereby the plates can be threaded toward the ends of their respective platforms to a correct height mutual to each other, clamped into position, and cabling connections reestablished. It is unlikely that these components would require replacement but adequate access is provided nonetheless.

It is also not anticipated that replacement of the platforms themselves would be needed since they carry and position the plates without any moving parts or points of wear, however removal and replacement of either or both the stator/rotor platforms can be executed through other types of access and removal methods while the aerostat remains aloft. As shown in FIG. 1F, design of a lateral mounting and clamping arrangement may be executed by a Quick Release Platform 111 arrangement for retaining both the stator and/or the rotor platforms within unthreaded half circle bases located atop either I-Hub 15 or within the bottom of an Assembly Coupler 73. This would be a preferable alternative to their previously described vertical insertion and threading. Through employing a Quick Release Pedestal 112 arrangement where the retention of the Quick Release Platforms 111 within and against a Quick Release Undercut 113 within each pedestal by a Quick Release Closure Plate 114, the platforms may be easily released or sturdily retained. This arrangement would allow full lateral removal of either or both of the fully intact stator and rotor platform assemblies after their disconnection from their cabling and conductors, without unscrewing them from their respective threaded bases.

Figure 3:
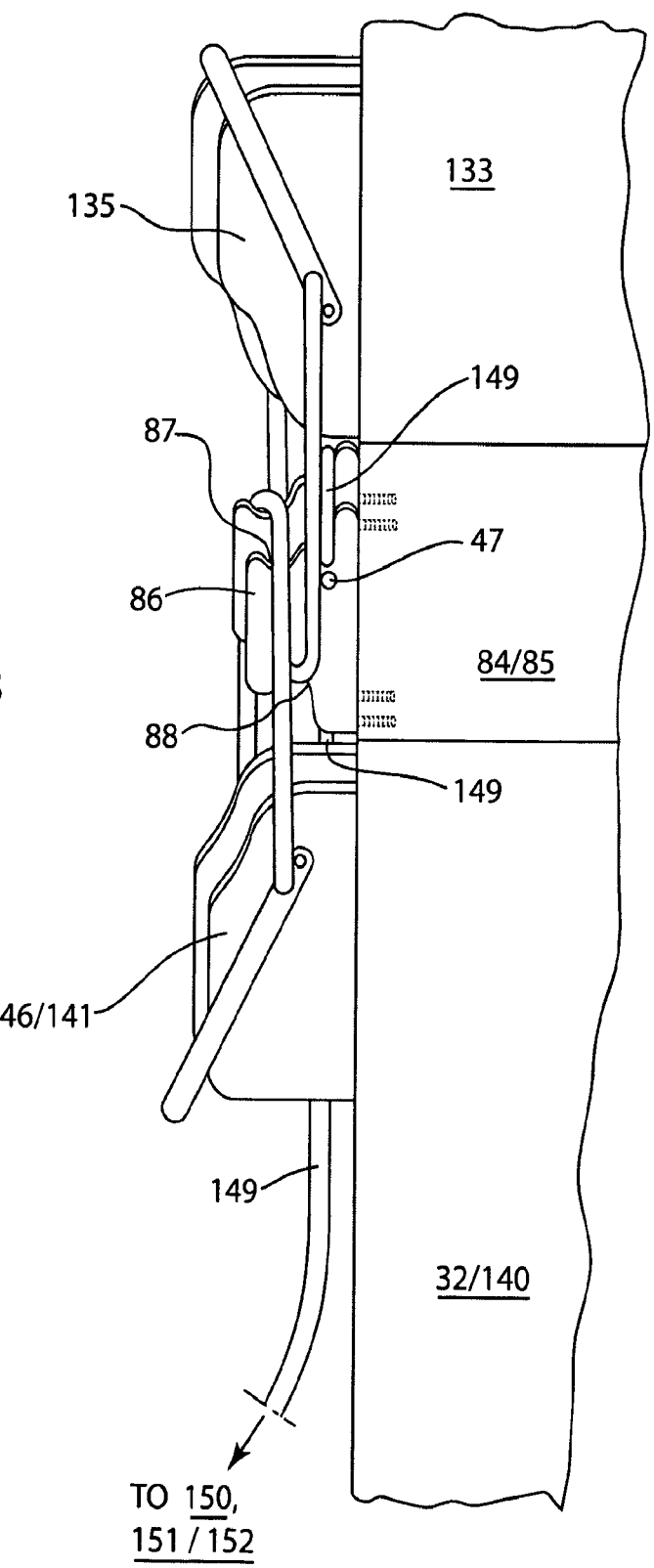
FIG. 3 is a drawing of the quick attachment/release structures defining clamping assemblies used between a removable tether pipe assembly and a stationary anchoring vessel, and/or a capture and transfer system, and/or a protective pot.

Viewing FIG. 3, another alternate method for their access and removal would be through a short limited vertical release of the Rotatable Tether Pipe Assembly 48 by a set of Draw Clamp Latches 46 and a Safety Anchor Cables/Straps 149 system. This combination would enable partial release and retaining restraint of the Rotatable Tether Pipe Assembly 48 that consequently would allow either or both platforms to be unscrewed and vertically replaced. Another access method is the total release and removal of the Rotatable Tether Pipe Assembly 48 by an Extraction and Transfer System 130.

Figure 4:
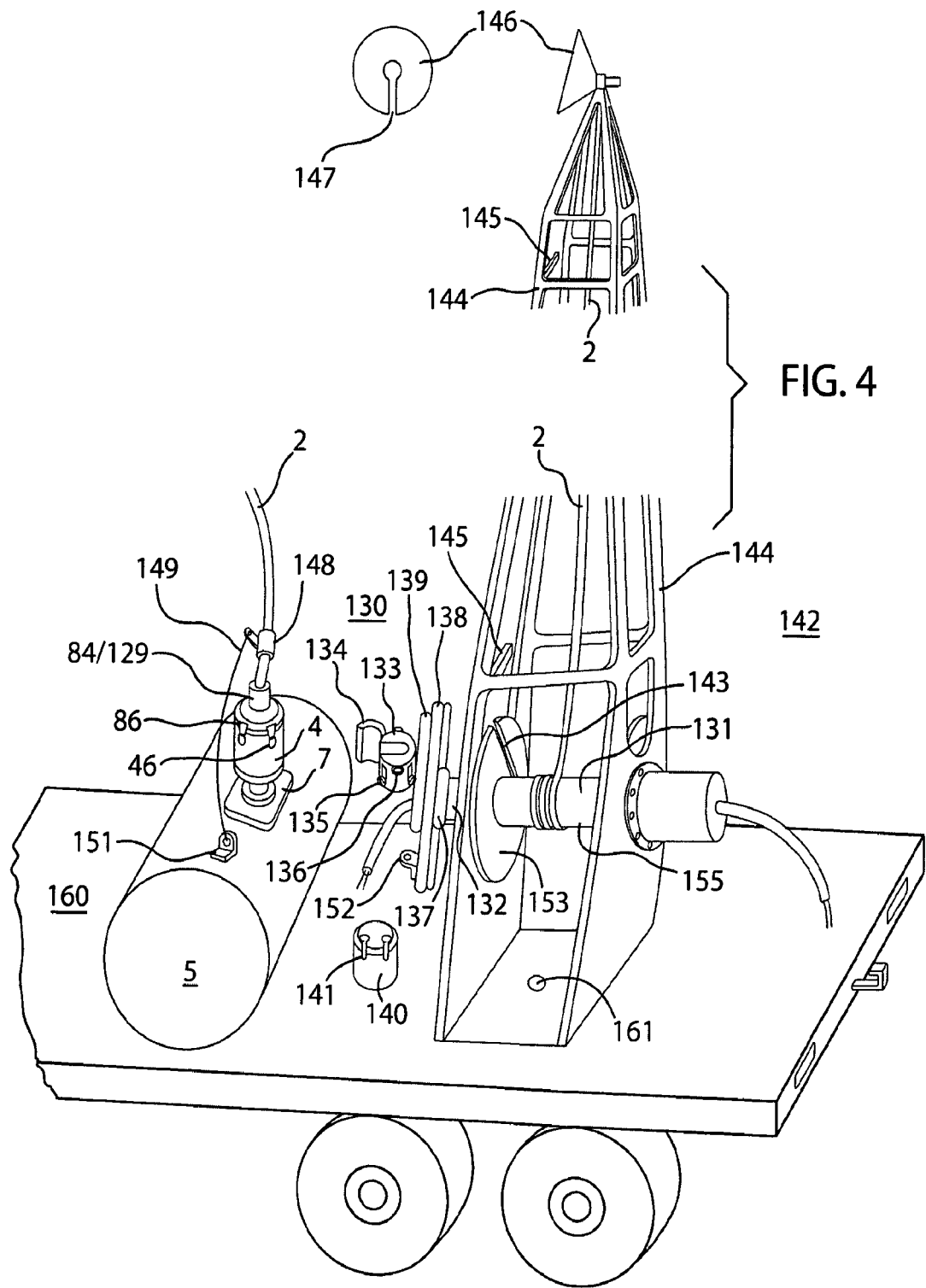
FIG. 4 is a drawing of the preferred embodiment of an aerostat ground handling arrangement.
Figure 5:
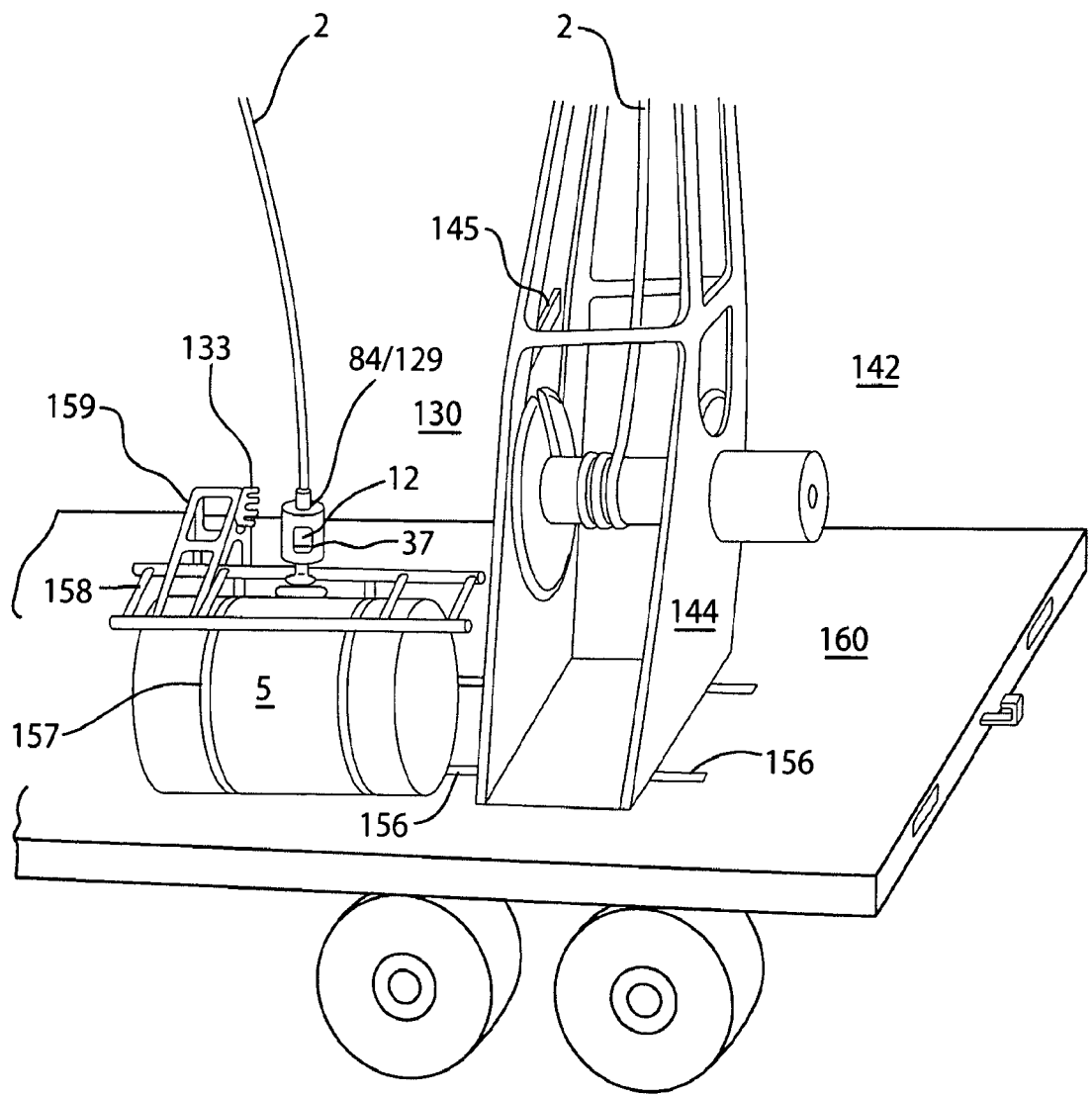
FIG. 5 is a drawing of an alternate embodiment of an aerostat ground handling arrangement.

Viewing FIGS. 4 and 5, total removal is accomplished by the transfer of the entire Rotatable Tether Pipe Assembly 48 to a deployment/retrieval Tether Spool 131 via the Extraction and Transfer System 130. The total removal of the tether pipe assembly from the interior of the vessel would allow full unfettered access to either or both platforms as well as being an integral measure to the execution and operation of an Aerostat Deployment/Retrieval System 142 that will all be defined and explained in detail forthcoming.

Returning to FIG. 1, at or near the general intersection of the Middle Interior Third 34 with the Top Interior Third 35 of Barrel 32, an Interior Barrel Shelf 40 is provided. The shelf provides an integral circular ledge extending from the interior wall of the barrel that provides a platform and vertical stop for a Bottom Race Tray 41 to reside upon. The tray houses and retains a Bottom Race 42 in a close "press type" of mutual fit. The bottom race provides and defines a rotative pathway for the Lower Tapered Roller Bearing 43 to travel while the roller bearing itself provides support, low resistant rotative capabilities, and an axial centered point of vertical affixment for Rotatable Tether Pipe Assembly 48 within the barrel interior.

Situated directly above the lower tapered bearing, a Top Tray 44 has a central opening of select size that just telescopes over the bottom end of an Assembly Coupler 73. The assembly coupler is a particularly integral component as it couples the tether pipe assembly to and with the Rotatable Tether Pipe Assembly 48. Assembly Coupler 73 has defined Vertical Stops 74 upon its outer circumference that are formed by the bottoms of the Locking Flanges 122. These bottom surfaces vertically affix the position of Top Tray 44 upon the Rotatable Tether Pipe Assembly 48.

Upon assembly of the components that make up Anchoring Vessel 4, the Rotatable Tether Pipe Assembly 48 is lowered down into Anchoring Vessel 4 whereby Top Tray 44 acquires its own centered alignment over the Lower Tapered Bearing 43 or the two may employ a type of press fit where they remain together through inter-proximal friction. The top tray communicates the centered and rotative qualities of the system to and for the mutually attached remainder of the components of Rotatable Tether Pipe Assembly 48 that are all suspended as a unit down through the Top Open End 45 of Barrel 32 within the interior of Anchoring Vessel 4.

As an important extension of the preceding and as a direct result of Lower Tapered Roller Bearing 43 being sandwiched between the Top Tray 44 that is affixed to the Rotatable Tether Pipe Assembly 48 and the Bottom Race Tray 41 that has stationary affixment to Barrel 32, all of the described components functionally combine to additionally provide precision centered alignment, vertical positioning, and rotative capability for the physical and functional relationships between Rotor Plate 77 to the stationary Stator Plate 27 of their respective support platforms.

The lower bearing carries the entirety of the downward, "weight bearing", vertical load of the Rotatable Tether Pipe Assembly 48 while defining and maintaining a fixed relationship to Barrel 32 of Anchoring Vessel 4. The lower bearing tray and race are stationary components affixed to the walls of Barrel 32. The Top Tray 44 and the Lower Tapered Roller Bearing 43 are rotative components that travel with the remainder of the components that make up the entire Rotatable Tether Pipe Assembly 48. Furthermore, Lower Tapered Roller Bearing 43 acts in combination with its sister component, Upper Tapered Roller Bearing 83, to mutually provide bi-directional axial resistance and support in concert with the simultaneous provision of relatively low resistance rotative capabilities for the system. Additionally, the pair of roller bearings also heavily contribute to the provision of radial alignment and support for the Rotatable Tether Pipe Assembly 48 that is also augmented by another set of bearings whose description is forthcoming. However, it is requested to be understood that Upper Tapered Roller Bearing 83 and Lower Tapered Roller Bearing 43 can together assume and be the sole source provider of both axial and radial support to and for the Rotatable Tether Pipe Assembly 48 as it exits the top of Anchoring Vessel 4.

The Top Hat Assembly 84 sits at the very top of Anchoring Vessel 4 and generally consists of three component parts, a Bushing 85, a Brim 90, and a Detachable Chimney 93.

Bushing 85 is the component that joins the Top Hat Assembly 84 with the remainder of the anchoring vessel. The bushing is designed to fit within the Top Open End 45 of Barrel 32 and is formatted to have vertical slide out "instant" release and withdrawal of a select portion of its exterior circumference from within and out of the open top of the barrel. This novel feature is very important as it selectively allows the complete Top Hat Assembly 84 and the Rotatable Tether Pipe Assembly 48 that the top hat retains within the vessel, inclusive of the entire internal contents of the barrel from the Rotor Platform 75 upwards, to be all easily and instantly withdrawn as a unit from within and out of the barrel enclosure. An itemized list that contains both the top hat assembly parts and the tether pipe assembly parts, that are all to be withdrawn as one unit, will be included in later description.

To maintain the airtight qualities of the Anchoring Vessel 4, the quick release juncture between the Top Open End 45 of Barrel 32 and Bushing 85 is cooperatively fitted with gasket/O-Ring seals known to art that depends-upon vertical pressure applied between the two components to maintain both a gastight seal as well as their reliable interconnection. This is accomplished by a plurality of adjustable draw clamp assemblies. The Draw Clamp Latches 46 of the draw clamp assemblies are mounted upon the circumference of the Top Open End 45 of Barrel 32 where they latch over mating Draw Clamp Bases 86 that are mounted on the circumference of Bushing 85 of Top Hat Assembly 84. The base portions of the draw clamps pull triple duty as latch bases that will be discussed in detail forthcoming. The draw clamp assemblies have reliable tested ranges and ratings of capacity that allow their proper selection for size and duty in supplying a multiple of over-capacity for reliable restraint against the anticipated thrust forces generated by the deployed aerostat. Tipping forces are also partially resisted by the draw clamps however resistance to these radial forces are augmented by the close tolerance fit between the vertical alignment and overlap of the portion of the bushing that telescopes within the interior of the open barrel top thereby preventing any lateral tipping. The ability to select and supply a safety net of draw clamp capacity that greatly exceeds the anticipated maximum thrust loads along with choosing the quantity of draw clamp assemblies to be utilized enables a reliable system of restraint while offering the additional important feature of instant release upon demand.

It is requested to be understood that the just described insertion, sealing, clamping, and quick release arrangement for the interconnection between Top Hat Assembly 84 and Barrel 32 may also be successfully and beneficially employed for the interconnection between Barrel 32 and I-Hub Base 15 in lieu of the inter-threaded arrangement previously described.

Additional "Fail-safe" measures for the constant, continued, and assured anchorage of Aerostat 1 are supplied by a redundancy of auxiliary restraints. Anchor Bolt Flanges 150 are mounted beneath the heads of the Anchor Bolts 19 that are tightened within the threaded holes of Base Plate 7 that secures Anchoring Vessel 4 to the Ballast Tank 5.

Viewing FIGS. 1 and 3, Safety Anchor Cables/Straps 149 can now be run between an Anchor Bolt Flange(s) 150 to a special Catch or Holes 47 located upon the Draw Clamp Bases 86 that are mounted upon the bushing portion of the top hat.

Viewing FIG. 4, an additional and separate system of safety restraint is employed by running extra Safety Anchor Cables/Straps 149 between multiple independent Ballast Tank Anchor Flanges 151 to points of anchorage applied upon the tether itself in the form of redundant Safety Anchor Clamps 148 that are fastened directly over the circumference of Tether 2. Safety Anchor Cables/Straps 149 may also be connected to Tether Spool Anchor Flanges 152 during the process of transferring the Tether Pipe Assembly/Top Hat Enclosure Assembly 129 to the tether spool and thereby remain connected during the periods of aerostat retrieval or deployment.

Returning to View FIG. 1, Brim 90 of Top Hat Assembly 84 is a very significant and vital component as it retains the Upper Tapered Roller Bearing 83 directly beneath its bottom surface. A circular depression of select size is formed by the union of the brim with the bushing upon their mutual bottom surfaces. This depression forms an Upper Race Tray 91 that encloses and retains an Upper Race 92 via a close tolerance press fit. The upper race provides a defined track where Upper Tapered Roller Bearing 83 is free to rotate while furnishing the entire skyward thrust resistant capabilities for the aerostat/tether Anchoring System 3. The Upper Race Tray 91 and Upper Race 92 are stationary components affixed to the lower side of the Top Hat Assembly 84. The Upper Tapered Roller Bearing 83 and a Bottom Tray 82 that aligns and carries the upper tapered roller bearing are rotative components that travel in unison with the remainder of the components making up the entire Rotatable Tether Pipe Assembly 48.

The Top Hat Assembly 84 in general and Brim 90 in particular are positioned atop the Top Open End 45 of Barrel 32 where they make novel releasable attachment therewithin through their interconnection to and with Bushing 85. The interior of Bushing 85 has female threads that mate with male threads on the circumference of Brim 90 where they mutually form a Bushing/Brim Threaded Interface 89. A specialty wrench in the form of an adjustable pin wrench commonly known to the art may be used for their mutual tightening that enables fine adjustment of the inter-distance between the brim affixed upper tapered roller bearing to the barrel affixed lower tapered roller bearing. The final selection of the desired intra-distance between the two roller bearings is affixed through the tightening of clamping set screws located upon the circumference of Bushing 85. This fine adjustment and locking capability enables a technician to select, set, and affix a desired degree of play and resistance to rotation for the Rotatable Tether Pipe Assembly 48 by the precise variance of the distance between the two roller bearings and, concurrent with that adjustment, also orient at the same time the end to end positioning of the rotor and stator platforms/plates within the vessel. Further end to end fine adjustment is executed through adjustment of the rotor and stator plates within the ends of their respective platforms wherein they can be clamped and held in place by their respective sets of clamping screws.

Detachable Chimney 93 is a vertically oriented structure with a Bottom Opening 94 and a Top Opening 95. The primary purposes of the chimney are to provide fine rotational alignment, support, and lift gas sealing qualities to the exterior of the Rotatable Tether Pipe Assembly 48 that enters beneath the chimney through Bottom Opening 94 and passes through its center and out Top Opening 95. Each of these openings house within their respective ends, a bearing tray, a radial bearing, and accompanying lift gas seal(s). Bottom Opening 94 of Detachable Chimney 93 houses a Lower Bearing Tray 100, a Lower Radial Bearing 101, and a Lower Seal 99. Top Opening 95 of Detachable Chimney 93 houses an Upper Seal & Bearing Tray 105, an Upper Radial Bearing 104, and an Upper Seal 106 that will all be explained in full detail forthcoming.

The chimney portion and the brim portion of the top hat assembly have novel releasable attachment to each other. The brim portion of the top hat assembly has a select size Central Opening 109 that forms a detachable fit with the Chimney 93 portion of Top Hat Assembly 84. The central opening of Brim 90 is fitted with Brim Detachment Slots 98 around the inner rim of its opening. These closure slots mate and facilitate interconnection via twist and lock fit with Chimney Detachment Tabs 97 that are integrally affixed around the outer circumference of Bottom Opening 94 of the chimney. Collectively the closure arrangement provided on each component form a Brim/Chimney Juncture 96. It is requested to be understood that the reversal of the closure slots/tabs arrangement upon the brim/chimney components could be employed with no ill consequence. The chimney portion of the top hat assembly also carries and houses additional structures and components that are of high importance that will be discussed in full detail forthcoming.

Novel secure attachment and seal of Tether Pipe 50 to the ground based end of Tether 2 is executed through stripping the outer casing of the tether's terminal end to a specified length identified as a Tether Strip Point 49. The removal of a portion of the outer casing of the tether fully exposes the inner components of the tether that include the electrical conductors, fiber optic cabling, tensile fibers, gas supply tubing, lightning suppression, etc., that are hereafter termed as Bundle 72. The stripped portion along with a select portion of the tether that remains unstripped with its outer casing intact, are all inserted a select distance within the tether pipe. The Tether Pipe 50 has a select portion of its length, a Tether Pipe Swaged Area 51, which is swaged down to a reduced diameter over a similar length of the unstripped portion of the exterior of Tether 2, a Tether Swaged Area 52, where they mutually form an airtight seal and interconnection between themselves. The sealing performance between the tether and tether pipe can be additionally augmented by coating the parts with adhesives or sealants before swaging. Primary and highly secure final anchorage of the tether within the tether pipe is achieved through the novel attachment and anchoring of the tether's embedded longitudinal Tether Tensile Fibers 58 at the terminal end of the tether pipe.

Before further anchoring of the tensile fibers that pass out the end of the tether pipe takes place, rotative components must be added at this point to the tether pipe assemblage that will directly provide and carry the entire load of anchorage capability for the Rotatable Tether Pipe Assembly 48 within and to Anchoring Vessel 4. The Upper Tapered Roller Bearing 83 is first added, exposed roller bearings side up, along with Bottom Tray 82 that will carry the upper tapered roller bearing. The bottom tray has a central unthreaded opening of select diameter to just telescope over the exterior of the adapter portion of a Tether Pipe Adapter 61. Since the Tether Pipe Adapter 61 is to be integrally attached to Tether Pipe 50, this overlying Bottom Tray 82 in combination with Upper Tapered Roller Bearing 83 will later align and center the entire tether pipe assembly with and to the Upper Race 92 affixed beneath the Bushing/Brim Threaded Interface 89 of the Top Hat Assembly 84. It should be noted here that the type of interconnection between the Tether Pipe 50 and the Tether Pipe Adapter 61 can be permanent, such as weld or other manufacturing technique producing a secure single component structure, or the end of the tether pipe may possess male threads that allow the adapter to be added and threaded onto the tether pipe when desired.

An Assembly Plate 57 that has a central unthreaded opening of a select diameter to just slide over the threaded portion of Tether Pipe Adapter 61, is now applied. This assembly plate is to be the key inter-connective component and point between the tether pipe and the overlying tapered roller bearings. A Toothed Clamping Adapter 62 is equipped with female threads at its anterior end and is inserted over and tightened upon the Tether Pipe Adapter 61. This traps and affixes Assembly Plate 57 between the Toothed Clamping Adapter 62 and a butt ledge at the juncture of the threads and the adapting portions of Tether Pipe Adapter 61. This assembly plate that is now affixed to the tether pipe and will have further interconnection to the remainder of the Rotatable Tether Pipe Assembly 48 that will be described forthcoming.

On the opposite posterior end of Toothed Clamping Adapter 62, it is equipped with a male threaded portion at its very terminal end. Just anterior to that threaded portion, an integral circumferential plate bearing teeth upon its surface is provided. These integrally exposed teeth are half of a gripping plate solution provided where the secure attachment of the Tensile Fibers 58 of Tether 2 are to be accomplished. The tensile fibers are folded over the teeth of the adapter and clamped by and between complementary teeth that reside upon the end of a Sliding Toothed Clamping Plate 63 that is added over the terminal threaded portion of the Toothed Clamping Adapter 62. The free movement of the sliding clamping plate enables it to be driven against Toothed Clamping Adapter 62 by the rotation and tightening of a female threaded Drive Plate 64 onto the male threads at the terminal posterior end of the clamping adapter. The grip executed between the two toothed plates along with the right angle bend the tensile fibers must travel in reaching the teeth together bolster the anchorage qualities and capability that the tensile fibers provide for the tether. An Abrasion Insert 65 is inserted within the end of Toothed Clamping Adapter 62 to cushion the remaining components of Bundle 72.

Alternately, a tapered plug arrangement common to the art can be employed where the tapered plug is tightened within a cooperative mirrored tapering provided within the terminal end of the tether pipe. This type of arrangement enables clamping forces to be exacted upon the tensile fibers of the tether that are consistent with the higher the degree of tensile pulling forces placed upon the tensile fibers, the greater the degree of the responding application of increased clamping forces executed upon those same fibers.

Continuing the assemblage for the Rotatable Tether Pipe Assembly 48, it is recalled that the Upper Tapered Roller Bearing 83 and the Bottom Tray 82 that carries the bearing were both pre-inserted over the tether pipe before the Assembly Plate 57 was applied and affixed against the bottom of the Tether Pipe Adapter 61 by the anterior end of Toothed Clamping Adapter 62. In addition, Assembly Plate 57 carries male threads upon its exterior circumference that are threaded within a female threaded top opening of Assembly Coupler 73. The top end surface of Assembly Plate 57 is threaded into the top of Assembly Coupler 73 until both top surfaces are flush with each other. Clamping Set Screws 14 located around the top exterior of the assembly coupler are tightened to affix their mutual inter-threading.

On the opposing bottom opening of the Assembly Coupler 73 another female threaded opening is provided that is of similar size to the top female threaded opening. The top male threaded end of Rotor Platform 75 is completely threaded into the bottom opening of the Assembly Coupler 73 and Clamping Set Screws 14 located around the bottom exterior of the assembly coupler are tightened to affix their mutual inter-threading. With the rotor platform now in place, the conductor and communications cabling embedded within the tether and extending from the end of the swaged tether pipe can now be attached to Brush Standoffs 79 that extend through Rotor Plate 77 of Rotor Platform Assembly 81 as outlined in detail during earlier description.

The middle exterior of Assembly Coupler 73 carries a plurality of longitudinal oriented Locking Flanges 122 upon its exterior. A Large Drive Gear 121 has a matching plurality of Notches 123 around its inner diameter spaced in an intersecting arrangement to Locking Flanges 122. The Large Drive Gear 121 inner notches are directly mounted over the locking flanges of Assembly Coupler 73. The Top Tray 44 that is to carry Lower Tapered Roller Bearing 43 beneath is now added over the bottom exterior of Assembly Coupler 73. This arrangement locates the Large Drive Gear 121 between the Bottom Tray 82 of Upper Tapered Roller Bearing 83 and the just added Top Tray 44 of the Lower Tapered Roller Bearing 43. The notches of the large diameter drive gear now directly engage the locking flanges located upon the circumference of the Assembly Coupler 73 that itself is integrally connected and locked with the tether pipe via the Assembly Plate 57. All of the components that comprise the Rotatable Tether Pipe Assembly 48 are now assembled in total. The only remaining description is for the intra-assembly of the Rotatable Tether Pipe Assembly 48 within Top Hat Assembly 84.

It will now be further defined how the tether pipe, along with its now integrally attached tether, are to be inserted and affixed within the top opening of the vessel in a manner still permitting free rotation of the tether pipe/tether arrangement while still providing adequate alignment, restraint, and gas sealing qualities to and for the vessel of the anchoring system.

More particularly, the vessel encloses bearings that directly resist any "in line" axial thrust forces and/or "off axis" radial forces placed upon the tether termination pipe while still enabling it to remain rotatable while affixed within the vessel. These tensile and radial forces are largely in summation to the combined effect of the lift factor of the aerostat itself and the variability of the wind speed and direction that is bearing upon the considerable surface area of both the lift gas containment envelope of the airship and the tether itself. The generally round cross section of the lengthy tether presents a relatively low coefficient of resistance to air flow and thereby does a reasonably good job of cutting through the wind. However, the very lengthy nature of a tether still displays a relatively large surface area and represents a very substantial loading of radial forces. The sum of the wind forces applied upon the total length of the tether in combination with its own weight causes a pronounced "arced" shape between the aerostat and the ground anchor point. Sets of bearings contained within the vessel are specifically included to counter the combination of the vertical and lateral forces while enabling and promoting low resistance rotation of the tether pipe so that it may axially follow and negate the spiraling weathervaning effects of the wind. If a method for providing a rotating type of anchorage for the tether was not furnished, then the aloft airship would torque and corkscrew the tether and its inner structural components in an undesirable and damaging fashion causing failure of the anchoring system. Without a superior method for dealing with this torquing problem, the vessel design would fail to meet the anchoring system's primary intended function of greatly extending the periods of "on station" "in service" operation without requiring the aerostat to be retrieved to the ground for service.

One of the most important design features of the vessel containment system is how the internal bearing locations are divided into two distinct classes of bearings, primarily thrust resistant and primarily radial resistant. The longitudinal "axial resistant" thrust roller bearings and the perpendicular "off-axis resistant" radial ball bearings are located in generally separate areas of the vessel as independent systems and are treated as such in their orientation and the level they occupy within the vessel enclosure. The lower level roller bearings are generally located in the top third of the vessel and are the sole thrust resistant bearings. The specific type of roller bearing chosen is generally a tapered roller bearing that provides combined thrust and radial resistant qualities. The choice for a more all purpose "stand alone" type of bearing is specifically for reasons of system service where the tapered roller bearings could be required, for short periods of time, to assume the entire duties for anchoring the aerostat that will become evident in description forthcoming. For resistance to "off-axis" forces exerted upon the tether pipe as it exits the very top of the anchoring vessel, a set of radial bearings are included that are generally located within the top hat assembly. These radial ball bearings are radially resistant only.

The preferred embodiment describes both of these types and classes of bearings in their respective locations as having a set of matched bearings however it is requested to be understood that alteration of vessel design would permit one or more bearings per class and/or location. The radial bearings are generally situated at the top of vessel and are contained and positioned in a removable segment, the chimney, of the top hat assembly. This arrangement enables detachment of the chimney for access to the radial bearing set that the chimney houses and contains within both of its open ends. The detachable chimney permits inspection and/or service of the bearings while the aerostat still occupies a state of "in service" deployment. These radial bearings are first in line to resist and bear the full brunt of the perpendicular off-axis forces resulting from any relative "downstream" aerial movement and location of the aerostat.

It is recalled that the duties the anchorage vessel must perform include not only the retention of the tether pipe in a rotative and releasable fashion but additionally must act as a buoyancy gas plenum. It is therefore a necessity to also provide sealing components at the top of the vessel adjacent to the radial bearings that seal around the rotatable tether pipe to retain the positive internal pressure of the buoyancy gas within the vessel in relation to the outside ambient air pressure. The numbers of these internal or adjacent seals can vary accordingly with the degree of gas retention and degree of prevention of seal leakage sought but in general is described as at least one seal per radial bearing. This would equate to a minimum of at least two seals to equip a set of matched radial bearings. In general these seals would normally be in the form of elastomeric O-Rings.

During high winds, a considerable amount of "off-axis" forces can result in a nominal degree of lateral deflection of the tether pipe that consequently would cause these sealing components, located in or adjacent to these radial bearings, to be more prone to wear. Their potential need for scheduled inspection and/or service is thereby the reasoning for the total segregation of the physical location of the radial bearing set within the uppermost vessel component, the Detachable Chimney 93, of Anchoring Vessel 4. This permits both the detachable chimney and the radial bearings it contains to be removable for access to those radial bearings and, more importantly, to their adjacent seals.

Through novel vessel design the aerostat is able to remain deployed and its power and communicative aspects remain intact while the vessel chimney segment containing the radial bearings is detached from the top hat assembly of the vessel for service. Gas loss from the system is prevented by a remote control valving system, such as RC Shutoff Valve 71, that shunts off gas flow at appropriate points within the system. The quick detachment method for the vessel chimney is achieved in the following manner.

The radial bearings with their accompanying seals carry no significant thrust loads and thereby do not place any thrust loads directly on the structure of the chimney that positions and encloses them. A perpendicular attachment method is required for the chimney to the brim that is secure and preventive of radial "tipping" forces while being able to achieve an effective gas seal between the two components. A vertically actuated tab, slot, and undercut arrangement is employed where the mutual alignment of the Chimney Detachment Tabs 97 within the Brim Detachment Slots 98 allows application of down force to depress a compression member spring, gasket, and/or O-Ring to achieve a short segment lateral turn of the chimney down and passage beneath the undercut of the slots arranged around the Central Opening 109 of the brim. A vertical lock between the two components is achieved when the tab and slot are no longer aligned but instead the slot overlaps the tabs and prevents vertical displacement. Tipping is prevented by the close tolerance fit of the overlapping vertical walls of the two structures and their circumferential locking. The O-Ring situated between the respective vertically oriented butt ledges of the two components forms a generally airtight seal. Their mutual seal is completed concurrent with the applied down force used to depress the compression member and the short segmented lateral rotation executed to hold and maintain that compression and seal. Quick release of the chimney from the brim is executed by reapplying down force and reversing the segmented rotation. This once again aligns the tab and slot arrangement that allows their passage by one another thereby releasing the chimney portion from the brim portion of the top hat assembly. The requirement for the initial application of down force to depress the compression member in order to achieve reversal and release of the chimney makes their accidental unintended disengagement very difficult. The aloft aerostat places constant vertical thrust forces upon and out of the vessel that are in direct opposition to the downward force needed to disengage the chimney from the brim. If separation were to occur between the chimney and brim components, the secure anchorage and retention of the aerostat would remain completely intact since the thrust duties are carried entirely by the tapered roller bearings functioning beneath the brim of the top hat that still has secure assemblage to Barrel 32 of Anchoring Vessel 4 via the plurality of draw clamps and redundancy of safety cables.

Design provisions must include a method for fully resisting both the radial and the thrust forces of the aloft aerostat while still retaining the rotative capacity between the tether pipe and the anchorage vessel itself while the upper level radial bearings are out of service. This is accomplished by the isolation of the previously described set of roller bearings that the preferred embodiment illustrates as a pair of tapered roller bearings. These roller bearings are the sole "thrust resistant bearings" of the anchorage vessel. By being tapered, these roller bearings also offer the combined operative function of resisting both the off-axis and axial forces exerted upon the tether pipe while still providing and promoting low resistance rotation of the tether pipe. The taper roller bearings are able to be utilized in a totally independent manner for retaining the aloft "in service" aerostat while the upper chimney segment of the top hat assembly is temporarily detached and its set of radial bearings and, more particularly, its adjacent seals are being inspected and/or replaced. The overall effect upon the tether pipe itself from the detachment of the upper vessel segment containing the radial bearings is a shifting of the load deflection point for the tether pipe from just anterior to the uppermost radial bearing to just anterior to the uppermost tapered roller bearing.

It is not anticipated that the bearing tray/tether pipe seals would need replacing before the aerostat reaches the normal "interval" servicing period for the aerostat however detailed methods are still designed and made available for replacing either or both seals should it be necessary without incurring any system down time. It has been stated earlier that through lateral deflection of the tether pipe or other unexpected factors, that cumulative deterioration of one or both of the O-Rings may cause the seals to begin leaking lift gas. The following is a review of the design and planning within the scope of the present invention whereby either or both of the elastomeric seals could be serviced/replaced without retrieval of the aerostat to the ground.

There is one caveat to replacing the seals for the vessel even though adequate access is available to the bearing trays that house them at either end of the chimney portion of the top hat assembly. During the initial preparation and sealing of Tether 2 within Tether Pipe 50 all the chimney components have to be threaded over the tether "before" the tether pipe is swaged over the tether. This fact would also hold true for any post swaging attempt to add and apply a set of new fully intact O-Ring seals desired as repair and replacement seals. In order to accomplish this feat the tether would have to be cut off, new seals threaded over it, and then swaged within a new tether pipe. A simpler, more cost effective, and time saving solution is offered in the following.

After the considerable footage of the tether itself has been produced, special preparations and connections have to be made to the terminal end of the tether whereby the tether can be adapted for secure and dependable anchorage to the ground. Before the connective methods begin between the tether and the tether pipe, the present invention employs and includes a plurality of Extra Replacement O-Ring Seals 118 that are placed and slipped over the tether before the tether is swaged within the tether pipe. The extra multiple seals will be stored over the protruding excess length of the tether pipe that exits the anchoring vessel and in general rest adjacent and above the topmost functioning seal, the Upper Seal 106 of Detachable Chimney 93. The extra O-rings that are stored onto the tether pipe require coverage and protection from exposure to the outdoor elements. A cover with a sealing component(s), a Split Weather Boot 117, is selectively shaped to provide cover and housing for the O-Rings. It is generally a split structure with identical halves enabling it to be clamped around the tether pipe post-swaging. The cover provides sealed protection from the weather and sunlight for both the new replacement O-rings and the uppermost O-Ring top seal that is currently in place and functioning atop the chimney of the top hat assembly. Since the cover envelops the entire chimney portion where the upper seal is located, rain is deflected preventing water from reaching or ice from forming around the rotatable portion of a Chimney/Tether Pipe Interface 110 formed between the Tether Pipe 50 and the Upper Seal and Bearing Tray 105.

The topmost elastomeric seal of the vessel chimney, Upper Seal 106, will be more prone to wear due to it being the outermost seal that surrounds the tether pipe at a point where any side to side deflection of the tether pipe would cause this seal to receive the higher degree of impingement and wear.

The top seal can be directly removed and serviced without significant detachment or breakdown of the top hat structure. When the top seal is removed, the lower seal remains in place and functional thereby preventing cross contamination between the lift gas contained within the vessel and the outside ambient air. A Gas Port 103 is an access hole located upon the chimney exterior that communicates with the interior area of the chimney that defines an Interior Auxiliary Vessel Chamber 102 between the upper and lower radial bearing tray locations at the top and bottom ends of the chimney. Generally, the port functions as an outtake port that has interconnected tubing or piping that may communicate s with a ground based mechanical scrubber that removes contaminates and reconditions the lift gas that has been returned from the aloft aerostat. The port leading to the scrubber generally has either a manual or electronic shutoff valve that would need to be closed since removal of the top bearing tray to service the top seal will allow ambient outside air to infiltrate the now exposed Interior Auxiliary Vessel Chamber 102 within the chimney interior.

In order to access the top seal, Split Weather Boot 117 is removed exposing the Extra Replacement O-Ring Seals 118 lying beneath that were already threaded over the tether before the tether was swaged within the tether pipe. The Upper Bearing Tray 105 can now be directly removed by first loosening the Clamping Set Screws 14 located around the top exterior of the chimney and then loosening and unscrewing the upper bearing tray from Top Opening 95 of the chimney through use of an adjustable pin wrench. The bearing tray and the Upper Radial Bearing 104 it contains can now be slid up the tether pipe as a unit, along with the overlying supply of replacement seals, until reaching the smaller diameter of the tether itself. A temporary clamp may be applied over the tether in order to retain the upper bearing tray at its elevated position upon the tether while continuing the seal replacement process. The old Upper Seal 106 is extracted from its retentive groove within the bearing tray, severed, and removed from the tether pipe. A new seal is slid down from the supply above and is lubricated, inserted, and seated within the same retentive groove that is designed in particular to contain and house the O-Ring within the upper bearing tray. The temporary clamp is removed and the newly lubricated seal, the bearing tray, and the radial roller bearing are now slid as an assembled unit downward over the tether pipe where the bearing tray is threaded and tightened within the top opening of the chimney of the top hat assembly and the clamping set screws reapplied. The remaining replacement O-Rings are slid downward over the tether pipe and the Split Weather Boot 117 is reattached and a vacuum drawn to expel the ambient air that infiltrated Interior Auxiliary Vessel Chamber 102 of the chimney and the scrubber line valve is opened for further system reconditioning and pressure equalization.

The preceding can be accomplished while the aerostat remains deployed and its communications and power remain in service. If the lower seal needs to be accessed, inspected, or replaced then provision has been made to quickly detach the entire "Chimney" portion of the top hat assembly that houses both radial seals. Upon detachment of the chimney, secure retention of the tether pipe assembly is maintained by the remainder of the top hat assembly that anchors the set of tapered roller bearings beneath its surface within the vessel. The tapered roller bearings assume the total radial force resistant duties for the anchoring system while the upper tapered roller bearing in particular continues to solely handle the vertical thrust resistance anchoring duties of the still "in service" and fully deployed aerostat. It is requested to be understood that when it is said that the bearings involved in the anchoring system of this invention are designed to resist the radial and thrust forces placed upon the system by a tether that in turn is attached to the aloft wind-driven aerostat, it is additionally implied that the bearings utilized are able to satisfactorily resist and handle those forces while still enabling the tether pipe assembly that they restrain to still execute and maintain precise relatively low resistance rotation in relation to the anchoring vessel with no damage occurring to any of the components of the Anchoring System 3.

Removal of the chimney, and both the upper and lower O-Ring gas seals it contains, will interrupt the lift gas seal established within the vessel. Therefore the first maneuver executed is to manually or remotely close the valve for the Gas Port 103, the main Shutoff Valve 10 on Buoyancy Gas Standpipe 9, and a RC Shutoff Valve 71 at the Terminal End

70 of the lift Gas Supply Tube 53 that is embedded within Tether 2. It should also be noted here that if the central gas supply tube embedded within the tether is segmented into more than one passageway than a wireless valve would be needed for each passageway to control and contain the lift gas and/or prevent ambient air infiltration. The Split Weather Boot 117 is now removed exposing the Extra Replacement O-Ring Seals 118 lying beneath that were previously threaded over the tether before the tether was swaged within the tether pipe.

The extra seals are slid upwards until reaching the smaller diameter of the tether. Down pressure is applied and a slight counterclockwise twist is applied that releases the chimney from the brim of the top hat assembly. The entire detached chimney assembly is now worked up the Tether Pipe 50 until also reaching the reduced diameter of the tether and the extra seals. The temporary clamp is used to retain the chimney and the extra seals in their elevated position upon the tether while continuing the seal replacement process. The Lower Bearing Tray 100 can now be directly removed by first loosening the Clamping Set Screws 14 located around the bottom exterior of the chimney and then loosening and unscrewing the lower bearing tray from the Bottom Opening 94 of the chimney through use of an adjustable pin wrench. The defective lower O-Ring is extracted from its retentive groove, severed, and removed from the tether. A new replacement seal is acquired from the extras situated over the tether above the elevated chimney and clamp. The new O-Ring is worked down through the upper bearing tray and radial bearing, through the interior of the chimney, and through the lower bearing where it is lubricated and inserted within the groove that is particularly provided to contain the O-Ring within the lower bearing tray. It should be noted here that since the new replacement O-Ring acquired for the lower bearing tray has to be worked down over the tether pipe and "through the upper tray and radial bearing" in order to reach the lower bearing tray, that both seals will have to be replaced with the bottom seal replacement being executed first.

The newly lubricated seal, the bearing tray, and the lower radial roller bearing are now moved as an assembled unit and slid upwards where the bearing tray is threaded and tightened within the bottom opening of the chimney of the top hat assembly and the clamping set screws reapplied. The previous description for the procedure for the upper bearing O-Ring replacement is repeated. The temporary clamp is removed and the whole chimney assembly is slid down the tether and over the tether pipe toward the brim. The chimney closure tabs are aligned with the closure slots within the central opening of the brim and down pressure applied while executing the short twist necessary to re-establish the seal and lock of the chimney to the brim of the top hat assembly. The scrubber port valve is reopened to vacate and/or scrub the ambient air that infiltrated the system when the chimney was removed. Shutoff Valve 10 is reopened allowing fresh lift gas to refill the vessel interior to the desired pressure. There may or may not be a need for continued circulation of the gas isolated within the vessel through the scrubber unit to ensure its purity before reopening RC Shutoff Valve(s) 71 and reestablishing flow through the Terminal End 70 or the ends of the lift Gas Supply Tube 53 imbedded within Tether 2 to the aloft Aerostat 1.

Tether structure varies accordingly with the needs and the tasking assignment for the aerostat itself. Tensile fibers are normally built-in to reinforce the longitudinal strength of the tether. Other passageways and cabling can be included within the core of the tether in order to equip and fulfill the needs for the particular type of special duty aerostat. Often included are electrical power conductors, signal and communications cabling such as glass fiber optics, insulation measures that counter electromagnetic or other types of signal interference and crosstalk, and conducting layers to complete a discharge circuit from the aloft aerostat to a ground rod in event of a lightning strike thereby preventing voltage spikes by providing ample surge suppression and dissipation pathways. A central passageway, such as Gas Supply Tube 53, may be included to act and serve as bi-directional supply piping for the movement of lift gas to and from the aerostat. This enables the aerostat to endure and provide longer periods of "on station" service without requiring pull down to re-condition and/or replenish the lift gas.

Since the system bearings allow the tether termination pipe to rotate within the structure of the anchoring vessel, provision must also be made for the entire gamut of auxiliary components embedded within the body of the tether and encased within the Tether Pipe 50 to remain aligned and affixed without incurring damage during their rotation. Most importantly, all of the tether components must reliably maintain two-way ground station to aerostat communication, signaling, electrical current, and lift gas flow without compromise or interruption of their continuity or containment capabilities. Novel rotor/stator platform assemblies have been previously described to fulfill these requirements of providing uninterrupted power, signal, and gas transmissions between the base station and the aerostat while the tether remains rotatable in relation anchorage vessel. All of these structures have been designed to be highly serviceable and easy to assemble in a reliable manner within the containment vessel while still remaining relatively cost effective. Most importantly, the structures and methods employed by the mooring and anchorage system described for this invention provide for the isolation, access, and serviceability of all of the involved system components while the lighter-than-air vehicle remains deployed at operational altitude thereby collectively comprising and purporting a major industry improvement of high significance and consequence.

It is desired for the gas pressure range maintained within the tether's central feed tube to remain relatively low so that the supply tube "resistance to flow" levels will also remain low dictating that the tube wall diameters need not be excessive. These factors are all premium to the tether being able to maintain the lowest practical weight per linear foot possible which is an all important dynamic in the design characteristics for the overall size and lift factor of the aerostat itself. Low, slow, and steady is the preferred format for the pressure and the back and forth transfer of the lift gas between the aerostat and the ground based ballast tank. The transfer direction is coordinated to occur slowly over a period of time in the direction that is currently in sync with the rhythmic cycling of the expansion and contraction forces that are respectively intrinsic and fundamental to day and night heating and cooling. However, in the preferred embodiment of this invention, provision is made for the bi-directional flow of gases to be passed within the tether feed tube(s) 24/7 as needed without having to stringently comply and adhere to the optimal time of day or night or the particular season even though it is recognized that the coordination of gas flow is always best achieved while remaining harmonious with day and night heating/cooling and respective expansion/contraction.

The buoyancy gas normally employed within the aerostat is helium. It is of utmost importance to limit the loss of helium from the containment system due to its rising expense and ever expanding reduction in supply. However, helium leaks are an inherent and an omnipresent occurrence and concern due to the small size of the helium molecules making the gas very difficult to retain. With that task in mind, the low pressure range elected for influencing gas transfer and its intended steady flow rate make it plausible to employ O-ring elastomeric seals as the method of allowing rotation of the tether pipe while still maintaining the integrity of the gas seal around the pipe without significant loss of the lift gas. Such an arrangement for its accomplishment was previously described.

However, should it be needed, use of additional seals is an option for attaining superior sealing capabilities with the caveat of adding additional resistance to the rotation of the tether pipe assembly. The higher resistance of a plurality of O-Rings or other seals can be offset by electing use of a geared motor capable of powered turning in either direction to track and follow the rotation of the aerostat and to dissipate the torque forces placed upon the tether by the wind driven weathervane motion of the aerostat. It is anticipated that in achieving a balance between maintaining adequate sealing capabilities for the system versus providing proactive prevention of damage to a tether that is integrally connected to an aerostat that is oscillating to the natural currents of the prevailing winds, that the resistances to turning of the rotating system would be of a degree that would require the motorized version of the system.

To accomplish this task a Large Drive Gear 121 ring is included within the Rotatable Tether Pipe Assembly 48. The large diameter drive gear is mounted over the Assembly Coupler 73 between Bottom Tray 82 of Upper Tapered Roller Bearing 83 and a Top Tray 44 of the Lower Tapered Roller Bearing 43. The drive gear engages Locking Flanges 122 located upon the circumference of the Assembly Coupler 73 that lock it with the tether pipe via an Assembly Plate 57. The teeth of this large diameter ring gear pass in close proximity to the inner walls of Barrel 32 of Anchoring Vessel 4. A Gear Access Port 126 in the form of a slotted opening in a select area of the vessel wall allows alignment and meshing of a Small Drive Gear 125 mounted on the shaft of a Drive Motor 124 that is mounted upon the outer circumference of the barrel. The motor has a favorable gearing ratio to slowly but powerfully turn the Rotatable Tether Pipe Assembly 48. The integrity of the lift gas seal for the vessel is maintained by a Gasketed Motor Cover 127 that is attached over the motor and clamped to the side of the vessel. The use of a motor and gearing system to forcefully turn the tether pipe assembly allows a plurality of seals with ample resistance to meet the sealing qualities needed to retain the lift gas. Spiraling and torquing of the tether by the winds pushing and turning the aerostat are relieved as the bi-directional geared motor tracks and relieves the stresses at predetermined increments of revolution. A compass based and/or a GPS based sensor set system of a design known to the art track the rotation of the aerostat and trigger motor movement to negate the cumulative torque effects upon the tether.

Other cooperative methods may be employed to further assist in assurance of the capability to sustain quality sealing of the system while still retaining the rotational capabilities for the tether pipe. Multiple chambers can be provided whose pressure is monitored by sensors that coordinate and inject equalizing air pressure on the opposing ambient side of the seal to the helium side thereby helping reduce gas loss by negating any large pressure differentials that exacerbate leakage. Also, an all encompassing Cylindrical Enclosure 108 that has two halves can be assembled around the exterior of the fully assembled and "in service" Anchoring Vessel 4. The halves of the cylindrical enclosure are inserted within the open ends of a Lower End Cap 13 generally located between Base Plate 7 and I-Hub 15 and an Upper End Cap 13. The lower end cap of the cylindrical enclosure has a Lower End Cap Orifice 116 that aligns with the base plate and ballast tank orifices beneath thereby permitting direct communication between the Gas Chamber 12 of Anchoring Vessel 4 and the Ballast Tank 5 and its contents. The upper end cap has an Upper End Cap Orifice 115 that may be selectively sized to fit and seal around either the top of Detachable Chimney 93 or it may be elected to fit and seal directly around Tether Pipe 50. This forms an Exterior Auxiliary Gas Chamber 107 that completely surrounds and contains any escaped lift gas from the vessel/tether pipe seal point(s) or any other points of system leakage thereby forming an Exterior Auxiliary Gas Chamber 107. If this outer enclosure is not needed as an additional gas seal then other uses and benefits can still be contemplated such as providing an exterior measure of tamper resistance that enhances overall system security and/or potentially being used as an outer totally encompassing heating or cooling chamber with independent generation capabilities in order to counter particularly harsh environmental operational conditions.

Forthcoming are descriptive segments outlining the formation and the ordered assembly of all the related component parts comprising both the Rotatable Tether Pipe Assembly 48 and the Top Hat Assembly 84. These two primary assemblies themselves mutually combine to form a unitized master assembly of a Tether Pipe Assembly/Top Hat Enclosure Assembly 129 that is instantly removable as a unit from within and out the top of the anchoring vessel.

Viewing FIGS. 1 & 2, the assembly order for the "Top Hat sealing/bearing components" that are to be placed in the following sequence over the tether before prepping and swaging the tether pipe to the tether:

Flexible spring reinforcement commonly known as a strain relief structure may be employed at the juncture of the rigid tether pipe and the flexible tether
 (Optional)
 Solid weather boot (if the preferred arrangement of a Split Weather Boot/O-Ring Storage 117 is not used)
 Extra Replacement O-Ring Seals 118
 An Upper O-Ring/Radial Bearing Subassembly consisting of:
  1) Upper Seal 106
  2) Upper Seal & Bearing Tray 105 (O-Ring groove up)
  3) Upper Radial Bearing 104
 The Detachable Chimney 93 (Top Opening 95 first)
 A Lower O-Ring/Radial Bearing Subassembly consisting in the order of:
  1) Lower Radial Bearing 101
  2) Lower Bearing Tray 100 (O-Ring groove down)
  3) Lower Seal 99

The above listed upper and lower o-ring/radial bearing subassemblies are generally preassembled before applying over the tether. The outer dimensions of the radial bearings are pressed into the open "trays" of their respective bearing trays. Their respective O-Rings 106 and 99 are lubricated and inserted within their special circumferential grooves centered upon the faces of the centrally located holes on the ends opposite the ends of the trays that receive the radial bearings. The upper radial bearing tray subassembly can now be tightened within the Top Opening 95 of the chimney. The lower radial bearing tray subassembly can now be tightened within the Bottom Opening 94 of the chimney. They are both tightened until engaging and compressing their respective set of O-Ring Seals 120. A series of Clamping Set Screws 14 located around the top and bottom of the chimney are tightened upon the upper and lower radial bearing tray subassemblies thereby affixing their mutual positions within the top and bottom ends of the chimney. The lubricated seals enable the entire Detachable Chimney 93 that is pre-assembled to overlie the tether, including the "in place" top and bottom seal/bearing subassemblies, to later descend as one unit and be slid into an intimate "sealing" type of contact over and with Tether Pipe 50.

While executing the prepping and swaging of the terminal end of the tether within the tether pipe, a clamp is utilized to retain "up and out of the way", the preceding rotative and sealing components that have been pre-assembled onto the tether.

Preparation of the terminal "ground end" of the tether before interconnection (Swaging) to the tether pipe includes:

Prep Tether 2 by stripping a select length of the external jacket exposing all of the internal components to their predetermined preferred lengths that include the electrical conductors, fiber optic cabling, tensile fibers, gas supply tubing, lightning suppression, etc.

Pre-strip all conductor and/or cable leads and prepare connectors/terminals.

Split Lift Gas Supply Tube 53 and remove a select portion of the segmented central gas tube on one side thereby forming a Shortened End 54 that functions as a discharge gas port for buoyancy gas returning from the aerostat to be scrubbed and/or for the transfer of ambient air to control the degree of inflation of the aerostat ballonets. (Note: The end of the shorter portion of the gas feed tube is to be generally located parallel with the top of Slot 55 of Tether Pipe 50 so that it communicates within the Interior Auxiliary Vessel Chamber 102 of the Detachable Chimney 93 between the upper and lower radial bearing seals. The terminal end of the longer portion of the gas feed tube is to be located within the top of the rotor platform within the anchoring vessel. The longer tube can selectively function as either a single or bi-directional transfer passageway that is normally tasked with the delivery of new and reconditioned helium that is pumped and fed to the aerostat as needed. The shorter tube is normally tasked with the return conveyance of the contaminated lift gas from the aerostat to the system scrubber for reconditioning which restores the buoyant qualities of the gas to optimum levels however it could also be committed as desired to the bi-directional gas delivery and flow of a lift gas or for the delivery of ambient air to the aerostat as needed. It should also be noted that for a multi-segmented tether, multiple terminal lengths of gas tube(s) can be correspondingly created as illustrated in 2B of FIG. 2.

The next step is the building of the Rotatable Tether Pipe Assembly 48 through the swaging of Tether 2 within the Tether Pipe 50 and continuing with the assembly of all the component parts:

The outer cover of Tether 2 has been removed a predetermined distance, a Tether Pipe Strip Point 49. The stripped portion of the tether and its exposed Bundle 72 of previously imbedded components, along with a predetermined length of the tether that has not been stripped, are aligned and inserted within the tether pipe that has an integral Tether Pipe Slot or Slots 55. (The inserted portion includes the entirety of Bundle 72 which is collectively threaded within the top of the tether pipe and continues out the bottom end of the integrally affixed Tether Pipe Adapter 61.)

Prep the Tether Swaged Area 52 with sealant and/or adhesive and complete the final insertion and alignment within the Tether Pipe 50. Swage the top of the tether pipe onto the tether creating a Swaged Area 52 of the tether lying beneath a Swaged Area 51 of the tether pipe thereby forming a mutual gas tight seal respectively between the O.D. of tether and the I.D. of tether pipe that generally runs from a point on the tether pipe above its exit from Chimney 93 to the upper terminal end of Tether Pipe 50 leading to the aerostat.

Insert and affix a Slot Insert(s) 56 within Tether Pipe Slot(s) 55 that functions as a cross-piece that spreads internal components of the tether to ensure a clear gas passageway promoting free lift gas flow between the shorter gas feed tube and both sides of Tether Pipe Slot(s) 55 and out of the tether pipe and into the Interior Auxiliary Vessel Chamber 102 area of Detachable Chimney 93.

At the opposite lower terminal end of Tether Pipe 50, in their proper order and orientation, add respectively over stripped Bundle 72, over Tether Pipe Adapter 61, and over the Tether Pipe 50 itself, the following:

The pre-assembled Bushing 85, Brim 90, and Upper Race 92 components of the Top Hat Assembly 84.

The Upper Tapered Roller Bearing 83 (tapered end up), and Bottom Tray 82 for the upper tapered roller bearing. It should be noted that the central hole of Bottom Tray 82 retains a telescoping fit and position over the O.D. of the adapting portion of Tether Pipe Adapter 61 that is in integral affixment to the Tether Pipe 50.

Now similarly add in their proper order and orientation the Assembly Plate 57 and the Toothed Clamping Adapter 62 over Bundle 72 and the terminal male threads of Tether Pipe Adapter 61. The female threaded end of the Toothed Clamping Adapter 62 is tightened over and onto the Tether Pipe Adapter 61 thereby clamping Assembly Plate 57 between themselves at the terminal end of the tether pipe.

Circumferentially fold the outer tensile fibers of the tether over the integral teeth of Toothed Clamping Adapter 62.

Now properly orient and similarly add the Sliding Toothed Clamping Plate 63 and a Drive Plate 64 over the remaining components of Bundle 72 and over the male threaded end of Toothed Clamping Adapter 62 whereby the folded over tensile fibers are now located between the integral teeth of Toothed Camping Adapter 62 and the complementary teeth of Sliding Toothed Clamping Plate 63.

Now properly tension the tensile fibers of Tether 2 and securely tighten Drive Plate 64 onto the male threaded end of Toothed Camping Adapter 62.

Apply a capped Water Sleeve 66 with overlying Freeze Sleeve 67 over all tether imbedded components of Bundle 72. The water sleeve is then threaded onto the remaining male threads of Toothed Clamping Adapter 62 extending out the end of Drive Plate 64. Fill the sleeve with water through the bottom of and Slot Insert 56 within Tether Pipe Slot 55 to a predetermined amount that will completely fill the Water Sleeve 66. Adjust the freeze sleeve to the upper water level and flash freeze causing an internal ice plug to form near the bottom of tether pipe.

Pour epoxy through the same slot insert until reaching the bottom of the tether pipe slot thereby filling the Tether Pipe 50 upwards from the ice plug that was purposely formed within the top of Water Sleeve 66 through use of Freeze Sleeve 67. The curing epoxy will form a plug that seals the tether pipe extending from a Poured Pipe Plug Bottom 69 at the terminal end of the tether pipe to a Poured Pipe Plug Top 68 that in general is flush with the bottom of Tether Pipe Slot 55 within Tether Pipe 50. Allow epoxy to set and the internal ice plug to thaw and then remove the water sleeve from over the exposed ends of Bundle 72. The epoxy has set around all the internal tether pipe components thereby forming a gas tight internal seal that further defines an Auxiliary Gas Chamber(s) 39 within Tether Pipe 50 by the poured pipe plug that runs between the bottom end of the tether pipe and the bottom of the slot. The preceding is but one method for forming one or more of the Auxiliary Gas Chambers 39 within the interior of Tether Pipe 50.

If not previously done, prep all internal components for their connections to the rotor plate of the rotor platform.

The Bundle 72 is slipped down through the top female threaded end of Assembly Coupler 73. The assembly coupler is aligned and rotated over the male threads of Assembly Plate 57 until their top surfaces are generally flush. Their mutual affixment is locked through the tightening of Clamping Set Screws 14 located around the top of Assembly Coupler 73.

Interior Locking Notches 123 of a Large Drive Gear 121 are aligned and inserted over Locking Flanges 122 located on the exterior circumference of Assembly Coupler 73.

The Top Tray 44 for Lower Tapered Roller Bearing 43 is properly oriented, tray opening down, and inserted up over the exterior of Assembly Coupler 73 until its top surface hits Vertical Stops 74 formed by the bottom surfaces of Locking Flanges 122.

The male threaded end of Rotor Platform 75 is inserted and tightened within the bottom female threaded end of Assembly Coupler 73 where their mutual affixment is locked by tightening Clamping Set Screws 14 located around the bottom end of the Assembly Coupler 73.

The male threads of Rotor Plate 77 are aligned and tightened within the female threaded open end of the Rotor Platform 75 where their mutual surfaces are adjusted in a general flush relationship and together form Rotor Platform Assembly 81. Their mutual affixment is locked by the tightening of Clamping Set Screws 14 located around the female threaded opening of Rotor Platform 75.

Proper connections for the prepped ends of the conductors and transmission cables of Bundle 72 that protrude from the end of Tether Pipe 50 and extend down within Rotor Platform Assembly 81 are respectively made to the Brush Standoffs 79 and the Rotor Bracket 80 integral to Rotor Plate 77.

The Lower Tapered Roller Bearing 43 is placed upon its Bottom Race 42 that has a press-fit within the Bottom Race Tray 41 resting upon the Interior Barrel Self 40 of Barrel 32.

The Rotor Platform 75/Assembly Coupler 73, and all the just described interrelated components above, are aligned and inserted down through the Lower Tapered Roller Bearing 43 until the Top Tray 44 bottoms out upon the top of the lower roller bearing. At this point a defined lower insertion stop is reached for the entire Tether Pipe/Top Hat Assembly 129 within Barrel 32 of Anchoring Vessel 4.

Alternatively, the lower tapered roller bearing may be press fitted over Assembly Coupler 73 and/or within Top Tray 44 where the lowered tapered bearing stays as a component portion of the Rotatable and Removable Tether Pipe Assembly 48 anytime that it is withdrawn from Anchoring Vessel 4.

Rotor Plate 77 has now been placed in precise close inverted alignment to its functionally counterpart, the Stator Plate 27, which resides within the top of the Stator Platform 25 held by the I-Hub 15 of Anchoring Vessel 4.

To finish the assembly between the Rotatable Tether Pipe Assembly 48 and the Top Hat Assembly 84 that combine to form the unitized master assembly of Tether Pipe/Top Hat Assembly 129, we now revert upwards to the top portion of the assembly. It is recalled that the Detachable Chimney 50 has been preassembled with its upper and lower o-ring/radial bearing subassemblies already in place and affixed within their respective top and bottom open ends of the chimney. It is also recalled that the interconnected Bushing 85, Brim 90, and Upper Race 92 components of the Top Hat Assembly 84, along with the Upper Tapered Roller Bearing 83 and the Bottom Tray 82 for the upper tapered roller bearing have all been previously added over the tether pipe and the tether.

The Detachable Chimney 50, with its now intact upper and lower bearing/seal subassemblies, is now aligned and mated within the Central Opening 109 of Brim 90 of the Top Hat Assembly 84 through the depression, seal, twist, and lock maneuver executed at the Brim/Chimney Juncture 96 that has been previously explained in detail.

The now totally intact Top Hat Assembly 84 is slid downwards along Tether Pipe 50 until its Upper Race 92, that has an integral press fit within the Upper Race Tray 91 formed on the underside of Brim 90, makes contact with the Upper Tapered Roller Bearing 83 carried by the Bottom Tray 82 that has previously been assembled with a telescoping fit over the Tether Pipe Adapter 61.

The Upper Tapered Roller Bearing 83, and the Bottom Tray 82 that positions and carries it, can pass no further downward than the top of Assembly Coupler 73 that is integrally attached to the Rotatable Tether Pipe Assembly 48 by their key mutual inter-connective component, Assembly Plate 57.

This brings the assembly full circle whereby the total components comprising the complete Rotatable Tether Pipe Assembly 48 have been inserted within and therethrough the total components comprising the complete Top Hat Assembly 84 thereby mutually creating Tether Pipe Assembly/Top Hat Assembly 129 that is able to be quickly and easily inserted and attached or extracted as a single unit respectively within or from the interior of Anchoring Vessel 4.

Lastly, it will be clarified what differentiates the complete list of components comprising the Top Hat Assembly 84 from those components comprising the Rotatable Tether Pipe Assembly 48. Should the top hat assembly be slid upwards along the circumference of the tether pipe, all the components that rise in unison with the top hat assembly (Upper Race 92 and upward) are claimed as such and all those components that remain with the underlying tether pipe (Upper Tapered Roller Bearing 83 and downward) are deemed exclusive to the Rotatable Tether Pipe Assembly 48 structure. It is also requested to be understood that the components comprising the Top Hat Assembly 84 are all stationary components when clamped within Anchoring Vessel 4 and the components comprising the Rotatable Tether Pipe Assembly 48 are all rotating components while clamped within Anchoring Vessel 4.

Termination of the tether's divided central gas feed tube into two different lengths along with the preceding described novel tether/tether slot/tether pipe bonding and epoxy pour technique has created two separate generally gas tight interconnections and chambers that communicate with their respective halves of the internally segmented gas feed tube within the tether. A first and main Gas Chamber 12 is enclosed within Barrel 32 of the Anchoring Vessel 4 and communicates with the longer division of the gas feed tube a Terminal End 70 that extends from the terminal end of the tether pipe and generally performs as an intake end for sending gas through the tether to the aloft aerostat. An Interior Auxiliary Vessel Chamber 102 is created within Detachable Chimney 93 between the upper and lower bearings/seal sub-assemblies and communicates with the shorter division of the feed tube via Tether Pipe Slot 55.

As shown in FIG. 2 extra Supplemental Trays 119 carrying extra Upper Seals 106 that form new sub-assemblies are added that would rest upon extra shelves provided within the middle chamber. These extra trays would extend across the chimney interior thereby further subdividing the middle chamber into even more gas tight chambers within the confines of the chimney. Any and all of these new gas enclosures are collectively termed as Interior Auxiliary Vessel Chambers 102. It is additionally projected, by adding additional slot(s) on the tether pipe, and by pouring and forming additional stacked chamber(s) within the tether pipe that would independently communicate with these newly formed extra chamber(s) within the chimney, that it would be feasible to form independent gas tight communicative passageways between the new chambers within the tether pipe, the new chambers within the chimney, and to and with three or more segmented divisions or passageways within the central gas feed tube of the tether. Multiple new independent passageways formed between the vessel and the segmented gas feed tube within the tether would enable a multitude of circulative routing possibilities. Dedication of one way gas flow per passageway that might be used 24/7 instead of intermittently would be a very significant improvement. It would be particularly useful for very large aerostats having inflatable envelopes of enormous volume. Arrangements can be made whereby enough volume and flow of clean buoyant replacement gas to a very large aerostat can sufficiently pass to replace the inherent lift gas leakage through single direction flow within one segment of the feed tube, have return scrubbing of the gas through single direction flow within another feed tube segment, and still pump ballonet air within another dedicated tube segment. The benefits and significance that the capability to provide extra gas passageway(s) that form additional separate and independent dedicated conduits between the ground operation station and the aloft aerostat can be further defined as follows:

Lift gas replacement or removal at an extremely slow pace. A dedicated passageway(s) would allow election of single or bi-directional flow to be done 24/7, in or potentially out of sync with daily heating/cooling cycles.

Establishment of a lift gas return for gas reconditioning through direct connection to a ground based gas scrubber. Air infiltration causes the internal gas mixture to lose buoyancy. Water vapor and other gaseous elements need to be filtered and removed to keep the lift gas at optimum buoyancy for longer station keeping. A dedicated passageway allows flow and conditioning to be done 24/7 which lengthens the all important factor of "time on station" without removal for service.

Ambient air to be available to be pumped 24/7 up to or even withdrawn from direct interconnection(s) with the independent inflatable ballonets located within the inflatable envelope of the aerostat or for other unspecified uses. These ballonets are commonly used for controlling aerostat internal pressure and its orientation in the air by moving ambient air in or out of these internal air bags. This would allow continued use of the important ballonets for aerostat stability and control but would eliminate the need for their accompanying blowers that conventionally are tasked with their inflation. This is highly significant due to the substantial weight of the blowers being removed from the aloft aerostat envelope and the fact that blower operation is often unreliable and in need of frequent repair and replacement of the switching components because of their frequent on/off cycling.

Multiple dedicated gas passageways formed and located within the terminal end of the tether and the vessel itself that uniquely communicate with passageways within the core of the tether promoting the slow and steady theme of gas transfer that allows smaller diameter passageways, at lower flow pressures, with thinner/lighter wall divisions. If situations arise where more capacity is needed, a "smart" valving system allows one way cooperative grouping of all the segments within the feed tube to fulfill an emergency need for high volume flow. Also with the capability to make use of constant 24/7 flow for gas replacement, gas scrubbing, and air pumping and removal, the probabilities are greatly increased for achieving the most extensive cycles of aerostat "on station" "in service" duration possible. Increasing the length of non-interrupted service is the optimum outcome for tethered aerostat systems that would result in many positive ramifications for their highly expanded usage.

The extra seals added within the chimney and around the tether pipe to create the extra independent passageways also have the additional benefit of reducing lift gas loss from the anchorage vessel with the negative of creating extra resistance to the physical rotation of the tether pipe. If this should be problematic, the previously described option for adding a bi-directional geared motor drive option to the anchorage vessel system is executed.

A comprehensive list of the parts enabling the complete instant detachability of both Rotatable Tether Pipe Assembly 48 and its accompanying sister fit within the Top Hat Assembly 84 including all of their interconnected structures and subassemblies that together mutually form a Tether Pipe/Top Hat Assembly 129 that uniquely has the capability for all of the inter-related components to be removed simultaneously as one unit, are outlined in the following.

The quick detachment of the entire Rotatable Tether Pipe Assembly 48 from within Top Open End 45 of Barrel 32 of Anchoring Vessel 4 that generally consists of:

the Tether 2
the Tether Pipe 50 itself
the Tether Pipe Adapter 61 (male threaded)
the Upper Tapered Roller Bearing 83
the Bottom Tray 82 (upper tapered roller bearing)
the Assembly Plate 57 (rotor/tapered roller bearings)
the Toothed Clamping Adapter 62
the Sliding Toothed Clamping Plate 63
the Drive Plate 64
the Abrasion Insert 65
the Assembly Coupler 73 (rotor/tapered roller bearings)
the Large Drive Gear 121 (motor)
the Top Tray 44 (lower tapered roller bearing)
the Lower Tapered Roller Bearing 43
the Rotor Platform 75
the Rotor Plate 77
the Rotor Bracket 80

The preceding in combination with the detachment of the entire Top Hat Assembly 84 from within the Top Open End 45 of Barrel 32 of Anchoring Vessel 4 that generally consists of:

the Bushing 85 (top hat assembly)
the Brim 90 (top hat assembly)
the integral Upper Race Tray 91 (underside of the brim)
the Upper Race 92 (underside of the brim portion)
the Detachable Chimney 93 (top hat assembly)
the Lower Seal 99 (chimney)
the Lower Bearing Tray 100 (chimney)

the Lower Radial Bearing 101 (chimney)
the Upper Radial Bearing 104 (chimney)
the Upper Seal and Bearing Tray 105 (chimney)
the Upper Seal 106 (chimney)

The preceding all combine to form the unitized structure, the Tether Pipe/Top Hat Assembly 129.

Viewing FIGS. 4 and 5, the total plan and method employed for the quick release of the components of Anchoring System 3 that restrain and retain Tether 2 within the confines of Anchoring Vessel 4 in a rotatable manner is particularly significant and useful for the combined unitized removal of the two primary assemblies, the Rotatable Tether Pipe Assembly 48 and the Top Hat Assembly 84. Upon their release, these two assemblies are handled as one as they undergo a set procedure of controlled removal, transfer, and attachment to a Tether Spool 131 that acts as a tether supply and storage spool during aerostat deployment or retrieval. The entire list of rotatable tether pipe assembly components in combination with the entire list of top hat assembly components have been previously defined as the master assembly, Tether Pipe Assembly/Top Hat Assembly 129. The Tether Pipe/Top Hat Assembly 129 must first undergo mutual temporary attachment to an Extraction and Transfer System 130 before their unitized removal as one master assembly from within and out of the Anchoring Vessel 4.

Viewing FIGS. 1, 3, and 4 to achieve secure extraction and transfer of the preceding component combinations to the tether storage spool, novel draw clamp arrangements are employed featuring draw clamp latches located upon three different system components. These latches are all placed and drawn over the same novel Draw Clamp Bases 86 mounted and affixed upon the face of Bushing 85 of Top Hat Assembly 84.

Viewing FIGS. 1 and 3, Draw Clamp Bases 86 have a conventional Upper Catch 87 that is the primary catch for the Draw Clamp Latches 46 located upon the top of Barrel 32 of Anchoring Vessel 4. In addition, the base portion of Draw Clamp Bases 86 also has a novel additional catch in the form of a Lower Catch 88 located on a lower indentation on its legs generally opposite to Upper Catch 87. The combination of these two opposing catch locations upon the base allows latches to be applied over the "same base" from two opposing directions.

Viewing FIG. 4, a U-shaped Capture Bracket 133 is provided with its own set of complementary latches, Draw Clamp Latches 135, that are mounted upon the capture bracket circumference in a spaced configuration congruent and parallel to the mountings of the Draw Clamp Bases 86 upon Bushing 85. The capture bracket latches are applied over the additional Lower Catches 88 on the bottom of the Draw Clamp Bases 86 of the Bushing 85 of the Top Hat Assembly 84 for securing the U-shaped Capture Bracket 133 to the top hat assembly.

After the Tether Pipe/Top Hat Assembly 129 has been extracted out of Barrel 32, the secondary attachment of a Protective Pot 140 over the extracted components is provided. Draw Clamp Latches 141 located and affixed upon the top circumference of the Protective Pot 140 are applied over and onto the very same Draw Clamp Bases 86 using the very same Upper Catch 87 locations previously used by Draw Clamp Latches 46. This new latching arrangement secures the attachment of all the extracted components within the protective pot thereby providing protection within for the entire rotatable/removable assembly similar to the protection previously provided within the barrel of the anchorage vessel. The attachment of the protective pot also provides the additional important benefit of providing the same lower defined vertical stop that latching within the barrel provides. The attached pot provides bi-directional "assembly within assembly" stability that ensures that the tether pipe assembly cannot slide downward within the top hat assembly in reaction to momentary loading of weight due to ramifications of the wind causing slack or other tether downward force to occur and then be jerked rapidly back upward in reaction to wind and the compensating lift value of the aerostat itself.

Returning to view FIG. 3, detailed explanation will be made for the Three Latching Arrangements:

First Draw Clamp Latches 46 are located upon the top of Barrel 32 of Anchoring Vessel 4 that provide normal closure and attachment to and for the Top Hat Assembly 84. Draw Clamp Latches 46 are placed over an Upper Catch 87 of Draw Clamp Bases 86 situated on the Bushing 85 of Top Hat Assembly 84 and then drawn downward locking the Top Hat Assembly 84 onto and within the open top of Barrel 32 of the anchoring vessel.

Second Draw Clamp Latches 135 are located upon the circumference of a U-shaped Capture Bracket 133 of an Extraction and Transfer System 130. Draw Clamp Latches 135 function in an inverted manner to Draw Clamp Latches 46 whereby the U-shaped Capture Bracket 133 encompasses Top Hat Assembly 84 from above by specifically sliding the U-shaped capture bracket over and around the Detachable Chimney 93 directly above Brim 90. A Hinged Front Closure 134 is closed and latched around the Chimney. Draw Clamp Latches 135 can now capture the Top Hat Assembly 84 from above as they are extended downward and placed within the Lower Catch 88 indentations at the bottom underside of Draw Clamp Bases 86 of the Top Hat Assembly 84. In order to make those new connections, each Draw Clamp Latch 46 on Barrel 32 has to be disconnected one at a time and alternated with the immediate establishment of the corresponding new latching connection from the above Capture Bracket 133. This alternating release and closing of latches continues until all the latches upon the capture bracket are drawn upward thereby locking the combined Tether Pipe/Top Hat Assembly 129 beneath U-shaped Capture Bracket 133.

Third Draw Clamp Latches 141 are located upon the top of a Protective Pot 140. The protective pot is an imitating version of a Barrel 32 of a simplified Anchoring Vessel 4. The pot replicates and employs a similar draw clamp arrangement as the method of attachment of the Protective Pot 140 to the Tether Pipe/Top Hat Assembly 129. It is recalled that the unitized Tether Pipe/Top Hat Assembly 129 is now suspended and locked beneath and to the U-shaped Capture Bracket 133. This allows the Protective Pot 140 to be aligned beneath the suspended assemblies and slipped upwards until contact is made between the top open end of the protective pot and Bushing 85 of Top Hat Assembly 84. Draw Clamp Latches 141 are placed upwards and over the Upper Catches 87 of Draw Clamp Bases 86 of Top Hat Assembly 84. This action and set up is very similar to that described for the $1^{st}$ latching arrangement between the Top Hat Assembly 84 and the Barrel 32 and uses the very same Upper Catches 87 on Draw Clamp Bases 86 for both clamping arrangements.

Now viewing FIG. 4, in order to attach the protective pot, none of the capture bracket latches have to be removed since they lie beneath the overlying protective pot latches. The capture bracket latches are currently tasked with the secure retention of the tether assembly that is restraining and anchoring the aloft aerostat. The purpose of Protective Pot 140 is to provide an enclosure that offers protection to the entirely exposed Tether Pipe/Top Hat Assembly 129 during the interval that it remains removed from the anchoring vessel. This includes the intervals of time during the transfer to the Tether Spool 131, during deployment or retrieval of the aerostat and/or the related service periods, and during the interval until the protective pot is removed and the Tether Pipe/Top Hat Assembly 129 is once again transferred back to and within Barrel 32 of Anchoring Vessel 4 and locked down through the re-establishment of the barrel latching arrangement.

A final duty assigned to the protective pot, should it be desired, is the ability to be equipped with similar rotative and inter-connective provisions that were employed within Anchoring Vessel 4 for quick cabling connectivity with the tether upon the protective pot being attached to the captured Tether Pipe/Top Hat Assembly 129. Upon the captured assembly being enclosed within the protective pot and the pot being transferred alongside the end of the storage spool, unique provisions for quick cabling connectivity are provided upon the storage spool, and in particular, upon an extendable portion of the storage spool that will be described in further detail forthcoming. These unique quick link provisions anticipate the desire to maintain some degree of power, communications, or possibly gas flow connectivity between the operations center and the aerostat during the intervals of time necessary to execute the deployment or retrieval of the aerostat respectively to and from its designated altitude.

Still viewing FIG. 4, it will now be described how the quick latching and locking arrangements enable the capture bracket to carry the captured Tether Pipe/Top Hat Assembly 129 up and out of the Barrel 32 of Anchoring Vessel 4 and subsequently apply and maintain a temporary interconnection for the Tether Pipe/Top Hat Assembly 129 to a Tether Spool 131 during the intervals that a winch system is employed to execute the controlled payout of the tether during deployment or retrieval of the tether and the attached aerostat.

The U-shaped capture bracket is mounted on a multi-dimensional travel Adjustable Rack 137 of an extraction system indirectly constructed upon Tether Spool 131. An Extraction and Transfer System 130 is formed whereby a secure attachment and transfer system is accomplished for the Tether Pipe/Top Hat Assembly 129 to selectively move back and forth between the Anchoring Vessel 4 and the Tether Spool 131 that is specifically designed for the deployment/retrieval of Aerostat 1.

The large diameter spool is anchored in nearby proximity to the ballast tank however it is spaced with sufficient distance to provide ample clearance for the safe operation of the spool and its winching system. The long axis of the tether spool is oriented perpendicular to the long axis of the ballast tank. The middle of the spool is in line with the anchoring vessel that is generally located and affixed atop the middle of the ballast tank. A large diameter central Spindle 132 which rotates within the base of Aerostat Control Boom 144 is aligned to bisect the mounting of the anchoring vessel upon the ballast tank. The spindle is both the axial pivot and the load carrying member that supports and turns a Thimble 155 with Endplates 153 at either end that together form Tether Spool 131. The spindle is extendable from the central axis of the spool where it can thereby reach the nearby mounting of the anchoring vessel upon the top of the Ballast Tank 5. This enables Spindle 132 to be selectively moved toward the ballast tank as desired to either attach or detach the capture bracket to and from Tether Pipe/Top Hat Assembly 129. The extended spindle can also be withdrawn away from the ballast tank and back to and within the tether spool where it brings the attached Tether Pipe/Top Hat Assembly 129 alongside. This attachment alongside and with the central spindle dictates that the Tether Pipe/Top Hat Assembly 129 and the integrally attached Tether 2 that is restraining the aloft aerostat will rotate in tandem with the powered winching action of the spool during retrieval or deployment of Aerostat 1.

A vertically elongated Stationary Base 138 portion of an Adjustable Rack 137 system is attached to the extendable end of Spindle 132. This attachment may or may not be pivotally capable. Integral tracks are provided upon the base portion to enable a shorter Movable Portion 139 of the rack to have manual or powered movement up and down vertically in relation to the Stationary Base 138 portion of the rack. For further variability in fine positioning, a gimbaled mount may be provided that has a gimbal base of known art that is attached to the track guided movable portion of the Adjustable Rack 137 system. This attachment may or may not be pivotally capable. The gimbal base of the gimbaled mount has integral attachment to a gimbal fork that is also of known design. The gimbal fork has pivot holes through the ends of each side of the U-shaped fork that receive Pivot Bosses 136 located upon opposing sides of the U-shaped Capture Bracket 133. The preceding arrangements equip the capture bracket to have gross vertical movements executed by the sliding portion of the rack whereas one of the pivoting base arrangements in combination with the pivot points of the gimbals' fork enables the capture bracket to have short incremental movements for fine alignment in multiple directions. Gross lateral movement of the capture bracket between the vessel and the spool is provided by the previously defined extendable Spindle 132.

In order to initiate capture of the Tether Pipe/Top Hat Assembly 129, the extendable spindle brings the capture bracket toward the ballast tank. The sliding movable portion of the rack aligns the capture bracket with the top of the brim enabling the U-shaped bracket to envelop the Chimney 93 of the Top Hat Assembly 84. Upon alignment the spindle extends slightly further forward. A Hinged Front Closure 134 is latched around the chimney providing preliminary centered attachment to the top hat assembly. At this time all of the redundant Safety Anchor Cables/Straps 149 can be detached one at a time from both the I-Hub Base and the ballast tank and reattached one at a time respectively to anchor points on the base of the rack itself and/or to anchor points upon the end of the spindle adjacent to the moveable rack. This re-establishes the system of full back up cabling ensuring the integrity of aerostat restraint during the transfer procedure. It is to be noted that if any anchoring strap attachment is made between any component retained by the capture bracket and any non-rotatable anchoring point, e.g. upon the spool support structure or any ground related stationary anchorage; these cables would then require detachment before utilizing the winch to rotate the spool.

With the safety cabling in place, final heavy duty latching and securement of Tether Pipe/Top Hat Assembly 129 within the U-shaped Capture Bracket 133 is executed by the afore described procedure for the respective alternating release and attachment between Draw Clamp Latches 46 and Bases 86 and Draw Clamp Latches 135 with the same Bases 86.

Upon removal of all of the Barrel 32 located Draw Clamp Latches 46, the movable rack retaining the U-shaped capture bracket is moved upwards withdrawing the captured Tether Pipe/Top Hat Assembly 129 from within Anchoring Vessel 4. The Protective Pot 140 is aligned and applied up and over the exposed tether pipe assembly until mating with the underside of the Top Hat Assembly 84. Draw Clamp Latches 141 are applied over the Upper Catches 87 thereby enclosing and locking the protective pot over the tether pipe assembly. Draw Clamp Bases 86 are now uniquely carrying clamping arrangements from two opposite directions.

The extendable Spindle 132, that is currently carrying the captured Tether Pipe/Top Hat Assembly 129 that has been inserted and latched within the protective pot, are all slowly retracted as a unit toward and alongside the spool.

The protective pot can be produced in two different configurations. It can be a simple bare enclosure used strictly for protecting the contents within or, as an option it can be a similarly equipped version of the anchoring vessel where it includes a similar Shelf 40, Race Tray, and Race along with similar points of interconnection for the various functional elements of the operational system. If those functional points of continuity are desired to be maintained during aerostat pull down or launch, it is at this stage that optional attachment and interconnection can be established between the protective pot and cabling/conduits that pass through an internal core of Spindle 132 and out its opposing end to the operations control center. It is requested to be fully understood that these quick links only need to be made in the event that a portion or all of the connectivity options available between the anchoring vessel and the aerostat are desired to be made available through similar provisions within or upon the protective pot to link the protective pot to both the operations station and the aerostat during its retrieval or deployment. These temporary links are feasible since the spindle is both the axial pivot and the load carrying member that supports Tether Spool 131. The tether pipe assembly, enclosed within the protective pot, is currently under capture and being carried by the Adjustable Rack 137 that is securely attached to the extendable end of the spindle. This arrangement enables the rack and the captured tether pipe assembly to rotate in unison with the spindle in the corresponding direction desired for the thimble of the storage spool to be selectively turned by the winch for either deployment or retrieval of the aerostat. Rotatable points of interconnection of conventional design are provided at the opposite end of the spindle for any or all the selected cabling and conduit links desired to be maintained between the operational station and the aerostat during pull down or launch.

The tether is then threaded through a Enclosable Slot 143, located on the end plate of the spool, which allow the tether to reach the circumference of the bed of the Thimble 155 of the spool. The opening formed by the slot is equipped with closure options to lock the tether within the confines of the spool thereby providing physical completion of the full circumference of the spool end plate. The spool is rotated and the tether wound onto the thimble bed.

The tether storage spool can also be coupled with a vertically extending adjustable boom system that is especially useful and often mandatory for controlling and mooring the larger volume aerostats. An Aerostat Control Boom 144 is generally aligned in a vertical anchored positioning over the tether spool. The tether is threaded through select Closeable Openings 145 located strategically at various points along the height of the boom frame until acquiring final threading of the tether through a Moorage Cone 146 located at the top of the boom. The moorage cone is provided with a tether threading provision in an Enclosable Slot 147 that is similar to Enclosable Slot 143 for End Plate 153 of tether Spool 131. Enclosable Slot 147 allows the tether to reach the central tether handling and dispensing orifice within the center of the moorage cone and then be appropriately locked. The spool, boom, and cone can now jointly be employed to safely and securely control the payout, retraction, or moorage of the aerostat by its restrainment Tether 2.

The attachment and disposition of Tether Pipe/Top Hat Assembly 129 alongside the tether spool is maintained during retrieval, storage, and/or service until, once again, the whole procedure is reversed whereby the spool is rotated in the opposite direction and the tether is payed out for aerostat deployment. The tether is unlocked and respectively retracted out of the slots and openings of the mooring cone, boom top, boom frame, and spool end plate. The spindle is re-extended in order to carry the whole assembly toward the ballast tank and over Anchoring Vessel 4. The original safety cable anchorage points are re-established upon the ballast tank and I-Hub. The protective pot is unlatched and removed. Proper vertical realignment is executed by the Movable Portion 139 of Adjustable Rack 137 whereby the Tether Pipe/Top Hat Assembly 129 is aligned over and once again lowered within the Anchoring Vessel 4 atop Ballast Tank 5. Alternate release and attachment respectively for each draw clamp latch of the U-Shaped Capture Bracket 133 and Barrel 32 are made one at a time. The instant the tether pipe assembly is latched within the anchoring vessel and gas valve adjustments are executed that allow purging and filtering of the ambient air whereby fresh lift gas can refill the vessel interior to the intended operational pressurization levels for communication with the gas passageway(s) embedded within the tether, all functional interconnections are immediately remade allowing the aerostat to begin straight away execution of its daily "in service" broadcast and communications relay activities.

Viewing FIG. 5, an alternate embodiment for an Extraction and Transfer System 130 for the handling and removal of the Tether Pipe/Top Hat Assembly 129 from the Anchoring Vessel 4, employs a Capture Cage On Rails System 159 that employs Ballast Tank Rails 158 affixed upon Ballast Tank 5 by Mounting Belts 157. After the Top Hat Assembly 129 has been aligned and enclosed within the U-Shaped Capture Bracket 133, the remainder of the handling procedure for the Aerostat Deployment/Retrieval System 142 follows in general the procedures and structures detailed for the preferred embodiment described for FIG. 4. Other embodiments may equip the boom structure itself with a Boom Alternate Rail System 156 or other type of common relocation system such as a Boom Pivot 161 is available to physically move or alter boom orientation.

Viewing FIG. 1, it is additionally contemplated that a similar, but inverted, Anchoring Vessel 4 and related systems in whole or in part could also be deployed at the opposite end of tether at or near its interface with Aerostat 1.

In summation, the subject of the current invention is outlined as an aerostat anchoring and control system that extends the time period whereby the aloft aerostat can remain "On Station" and "In Service" that is facilitated by a ground based anchoring vessel that retains the tethered aerostat while delivering a continuous flow of electrical power, communications connectivity, and buoyancy or other types and states of gases to and within the tether through a rotatable tether pipe assembly that is removable to aid in aerostat retrieval or deployment.

It is additionally requested to be recognized that the repeated cyclical deployment/anchoring/retrieval/mooring arrangements for the aerostat system of the present invention not limit the scope of the Intellectual Protection sought.

Other advantages and uses of the applicant's invention will become apparent to those skilled in the art from the previous descriptions and the claims hereupon and are requested to fall with the scope of this application.

Such scope is limited only by the following claims as read in connection with the preceding specification.

What is claimed is:

1. A method for increasing the deployment duration of an aerostat comprising:
   (a) deploying the aerostat with a lift gas envelope and an internal pressure ballonet;
   (b) utilizing a tether having at least two separate gas passages;
   (c) connecting at least one of said two separate gas passages of the tether to the lift gas envelope and connecting at least one of said at least two separate gas passages to the internal pressure ballonet; and
   (d) providing an earth based plenum or ground based plenum to supply the lift gas to the lift gas envelope of the deployed aerostat and supplying an auxiliary gas to the internal pressure ballonet of the deployed aerostat.

2. The method for increasing the deployment duration of an aerostat of claim 1 wherein the ground based plenum has a second plenum for handling a gas from the deployed aerostat.

3. The method for increasing the deployment duration of an aerostat of claim 1 further comprising having a rotatable tether pipe assembly connected between the ground based plenum and the tether.

4. The method for increasing the deployment duration of an aerostat of claim 1 further comprising adding communications cables and electrical cables to the tether and aerostat.

5. The method for increasing the deployment duration of an aerostat of claim 1 further comprising having an earth based facility for supporting the earth based plenum to supply lift gas.

6. The method for increasing the deployment duration of an aerostat of claim 5 further comprising adding a launch and recovery system to the earth based facility.

7. The method for increasing the deployment duration of an aerostat of claim 6 further providing an anchoring vessel with rotatable and removeable tether pipe assembly disposed within the anchoring vessel.

8. The method for increasing the deployment duration of an aerostat of claim 7 further comprising attaching the anchoring vessel to the earth based plenum.

9. The method for increasing the deployment duration of an aerostat of claim 7 further comprising utilizing tether spool.

10. The method for increasing the deployment duration of an aerostat of claim 9 further comprising adding a capture bracket to the spool for capturing the rotatable tether pipe assembly.

11. The method for increasing the deployment duration of an aerostat of claim 1 further comprising the step of adding aerostat buoyancy control instruments to an earth based plenum and operating buoyancy requirements of the aerostat from the earth based plenum.

12. A method to increase a deployment duration of an airship comprising:
   (a) deploying an airship having a lift gas envelope;
   (b) connecting a first end of a tether to the airship, said tether having a second end and at least one gas passage and at least one electrical cable and at least one communications cable;
   (c) providing an earth based air tight anchoring vessel having a rotor with an axial gas passage therethrough and a plurality of connectors disposed around the axial gas passage in the rotor, said air tight anchoring vessel also having a stator with an axial gas passage therethrough and a plurality of connectors disposed around the axial gas passage in the stator; and
   (d) connecting an earth based plenum to supply a lift gas through the axial gas passage in the stator and the axial gas passage in the rotor of the air tight anchoring vessel to the airship.

13. The method of claim 12 further comprising providing a second gas passage in the tether and connecting the first end of said second gas passage to the airship and the second end of the tether having the second gas passage to a radial gas passage in a detachable chimney on the air tight anchoring vessel.

14. The method of claim 12 further comprising providing for a flow of a contaminated lift gas from the airship through the first end of the tether having the second gas passage to the second end of the tether having the second gas passage to a detachable chimney on the earth based air tight anchoring vessel to recondition the contaminated lift gas at an earth based facility.

15. The method of claim 14 further comprising adding a launch and recovery system to the earth based facility.

16. The method of claim 12 further comprising the step of having an earth based facility for the earth based plenum.

17. The method of claim 16 wherein the earth based facility includes a tether spool.

18. A method to increase the deployed duration of an aerostat comprising:
   (a) deploying an aerostat with a lift gas envelope;
   (b) utilizing a tether having at least two separate gas passages;
   (c) connecting one end of the tether having the at least two separate gas passages to the aerostat;
   (d) connecting the other end of the tether having at least two separate gas passages to an earth based anchoring vessel having a rotor and a stator with an axial gas passage through the rotor and stator and at least one radial gas passage through a detachable chimney attached to the earth based anchoring vessel; and
   (e) connecting one of the at least two separate gas passages in the tether to the axial gas passage through the rotor and stator to the earth based anchoring vessel.

19. The method to increase the deployed duration of the aerostat of claim 18 further comprising adding communications cables and electrical cables to the tether and aerostat.

20. The method to increase the deployed duration of the aerostat of claim 18 further comprising having a gas chamber in the detachable chimney communicating with the at least one of the at least two gas passages in the tether.

* * * * *